(12) United States Patent
Beard et al.

(10) Patent No.: US 11,681,668 B2
(45) Date of Patent: Jun. 20, 2023

(54) SYSTEM AND METHOD FOR DEVELOPING AND IMPLEMENTING A MIGRATION PLAN FOR MIGRATING A FILE SYSTEM

(71) Applicant: NetApp Inc., Sunnyvale, CA (US)

(72) Inventors: Derek Beard, Sunnyvale, CA (US); Greg Althaus, Sunnyvale, CA (US); Jason Preston, Sunnyvale, CA (US); Duen-Wen Hsiao, Sunnyvale, CA (US); Alfred G. Prinz, III, Sunnyvale, CA (US); Fountain L. Ray, III, Sunnyvale, CA (US); Douglas Tharon Heath, Sunnyvale, CA (US)

(73) Assignee: NetApp, Inc., San Jose, CA (US)

( * ) Notice: Subject to any disclaimer, the term of this patent is extended or adjusted under 35 U.S.C. 154(b) by 0 days.

(21) Appl. No.: 17/060,519

(22) Filed: Oct. 1, 2020

(65) Prior Publication Data
US 2021/0026819 A1    Jan. 28, 2021

Related U.S. Application Data

(63) Continuation of application No. 14/981,818, filed on Dec. 28, 2015, now Pat. No. 10,853,333, which is a continuation of application No. 14/456,991, filed on Aug. 11, 2014, now abandoned, and a continuation of application No. 14/456,978, filed on Aug. 11, 2014, now Pat. No. 10,860,529.

(51) Int. Cl.
| | |
|---|---|
| *G06F 16/21* | (2019.01) |
| *H04L 67/1097* | (2022.01) |
| *G06F 16/11* | (2019.01) |
| *G06F 16/185* | (2019.01) |
| *H04L 41/0893* | (2022.01) |

(52) U.S. Cl.
CPC ......... *G06F 16/214* (2019.01); *G06F 16/119* (2019.01); *G06F 16/185* (2019.01); *H04L 67/1097* (2013.01); *H04L 41/0893* (2013.01)

(58) Field of Classification Search
CPC .... G06F 16/214; G06F 16/119; G06F 16/185; H04L 67/1097; H04L 41/0893
See application file for complete search history.

(56) References Cited

U.S. PATENT DOCUMENTS

| 5,432,912 A | 7/1995 | Kihara |
| 5,592,611 A | 1/1997 | Midgely et al. |
| (Continued) | | |

FOREIGN PATENT DOCUMENTS

| WO | 2013022582 A2 | 2/2013 |

OTHER PUBLICATIONS

Bossen D., et al., "Power4 System Design for High Reliability," IEEE Micro Magazine, March-Apr. 2002, vol. 22 (2), pp. 16-24.
(Continued)

*Primary Examiner* — Tamara T Kyle
*Assistant Examiner* — Lahcen Ennaji
(74) *Attorney, Agent, or Firm* — Cooper Legal Group, LLC

(57) ABSTRACT

A computer system implements a file system migration by determining a destination namespace of a destination file system based at least in part on a namespace of a source file system. At least a portion of the destination namespace includes an organization that is altered as compared to a corresponding portion of the source namespace.

20 Claims, 12 Drawing Sheets

(56) References Cited

U.S. PATENT DOCUMENTS

| | | |
|---|---|---|
| 5,710,885 A | 1/1998 | Bondi |
| 5,778,389 A | 7/1998 | Pruett et al. |
| 5,893,140 A | 4/1999 | Vahalia et al. |
| 5,937,406 A | 8/1999 | Balabine et al. |
| 6,324,581 B1 | 11/2001 | Xu et al. |
| 6,377,958 B1* | 4/2002 | Orcutt .................. G06F 16/116 |
| | | 707/693 |
| 6,401,093 B1 | 6/2002 | Anand et al. |
| 6,658,540 B1 | 12/2003 | Sicola et al. |
| 6,658,650 B1 | 12/2003 | Bates |
| 6,938,039 B1 | 8/2005 | Bober et al. |
| 7,035,907 B1 | 4/2006 | Decasper et al. |
| 7,069,278 B2 | 6/2006 | Telkowski et al. |
| 7,149,858 B1 | 12/2006 | Kiselev |
| 7,197,490 B1 | 3/2007 | English |
| 7,203,731 B1 | 4/2007 | Coates et al. |
| 7,444,335 B1 | 10/2008 | Colrain et al. |
| 7,571,168 B2 | 8/2009 | Bahar et al. |
| 7,574,443 B2 | 8/2009 | Bahar et al. |
| 7,603,372 B1 | 10/2009 | Honicky, Jr. et al. |
| 7,653,699 B1 | 1/2010 | Colgrove et al. |
| 7,698,306 B2 | 4/2010 | Watanabe et al. |
| 7,769,723 B2 | 8/2010 | Zheng et al. |
| 7,814,131 B1 | 10/2010 | Haynes et al. |
| 7,844,584 B1 | 11/2010 | Griess et al. |
| 7,904,466 B1 | 3/2011 | Valencia et al. |
| 7,925,629 B2 | 4/2011 | Webman et al. |
| 7,953,819 B2 | 5/2011 | Liang et al. |
| 8,078,816 B1 | 12/2011 | Thoppai et al. |
| 8,117,244 B2 | 2/2012 | Marinov et al. |
| 8,281,360 B2 | 10/2012 | Flewallen et al. |
| 8,285,817 B1 | 10/2012 | Balasubramanian et al. |
| 8,326,798 B1 | 12/2012 | Driscoll et al. |
| 8,346,966 B1 | 1/2013 | Phatak et al. |
| 8,452,856 B1 | 5/2013 | Lent et al. |
| 8,484,164 B1 | 7/2013 | Sivakumar et al. |
| 8,655,848 B1 | 2/2014 | Leverett et al. |
| 8,676,980 B2 | 3/2014 | Kreeger et al. |
| 9,116,914 B1 | 8/2015 | Muthirisavenugopal et al. |
| 9,305,071 B1 | 4/2016 | Bono et al. |
| 10,853,333 B2 | 12/2020 | Beard et al. |
| 10,860,529 B2 | 12/2020 | Prinz, III et al. |
| 2002/0032751 A1 | 3/2002 | Bharadwaj |
| 2002/0059451 A1 | 5/2002 | Haviv |
| 2002/0078174 A1 | 6/2002 | Sim et al. |
| 2002/0124079 A1 | 9/2002 | Pulsipher |
| 2002/0133491 A1 | 9/2002 | Sim et al. |
| 2002/0143984 A1 | 10/2002 | Hudson et al. |
| 2002/0156613 A1 | 10/2002 | Geng et al. |
| 2002/0174194 A1 | 11/2002 | Mooney et al. |
| 2003/0009480 A1 | 1/2003 | Lin et al. |
| 2003/0028514 A1 | 2/2003 | Lord et al. |
| 2003/0078946 A1 | 4/2003 | Costello et al. |
| 2003/0097454 A1 | 5/2003 | Yamakawa et al. |
| 2003/0158862 A1 | 8/2003 | Eshel et al. |
| 2003/0177107 A1 | 9/2003 | Brown et al. |
| 2003/0182313 A1 | 9/2003 | Federwisch et al. |
| 2004/0049702 A1 | 3/2004 | Subramaniam et al. |
| 2004/0054850 A1 | 3/2004 | Fisk |
| 2004/0078467 A1 | 4/2004 | Grosner et al. |
| 2004/0123154 A1 | 6/2004 | Lippman et al. |
| 2004/0133577 A1 | 7/2004 | Miloushev et al. |
| 2004/0250113 A1 | 12/2004 | Beck |
| 2004/0267830 A1* | 12/2004 | Wong .................. G06F 16/184 |
| 2005/0010838 A1 | 1/2005 | Davies et al. |
| 2005/0075856 A1 | 4/2005 | Wozniak et al. |
| 2005/0125503 A1 | 6/2005 | Iyengar et al. |
| 2005/0192918 A1 | 9/2005 | Delorme et al. |
| 2005/0193245 A1 | 9/2005 | Hayden et al. |
| 2006/0004765 A1 | 1/2006 | Anderson et al. |
| 2006/0010445 A1 | 1/2006 | Peterson et al. |
| 2006/0015507 A1 | 1/2006 | Butterworth et al. |
| 2006/0015584 A1 | 1/2006 | Ocko et al. |
| 2006/0064474 A1 | 3/2006 | Feinleib et al. |
| 2006/0069665 A1 | 3/2006 | Yamakawa et al. |
| 2006/0179037 A1 | 8/2006 | Turner et al. |
| 2006/0206603 A1 | 9/2006 | Rajan et al. |
| 2006/0212481 A1 | 9/2006 | Stacey et al. |
| 2006/0224843 A1 | 10/2006 | Rao et al. |
| 2007/0022121 A1 | 1/2007 | Bahar et al. |
| 2007/0022129 A1 | 1/2007 | Bahar et al. |
| 2007/0038697 A1 | 2/2007 | Zimran et al. |
| 2007/0055703 A1 | 3/2007 | Zimran et al. |
| 2007/0083570 A1 | 4/2007 | Fineberg |
| 2007/0088702 A1 | 4/2007 | Fridella et al. |
| 2007/0094354 A1 | 4/2007 | Soltis |
| 2007/0150936 A1 | 6/2007 | Maes |
| 2007/0156791 A1 | 7/2007 | Everhart |
| 2007/0156989 A1 | 7/2007 | Man et al. |
| 2007/0168046 A1 | 7/2007 | Misawa et al. |
| 2007/0183224 A1 | 8/2007 | Erofeev |
| 2007/0185938 A1 | 8/2007 | Prahlad et al. |
| 2007/0198722 A1 | 8/2007 | Kottomtharayil et al. |
| 2007/0299975 A1 | 12/2007 | Daschakowsky et al. |
| 2008/0010411 A1 | 1/2008 | Yang et al. |
| 2008/0028007 A1 | 1/2008 | Ishii et al. |
| 2008/0040385 A1 | 2/2008 | Barrall et al. |
| 2008/0235300 A1 | 9/2008 | Nemoto et al. |
| 2008/0281908 A1 | 11/2008 | Mccanne et al. |
| 2008/0294748 A1 | 11/2008 | Brown et al. |
| 2008/0306986 A1 | 12/2008 | Doyle, Sr. |
| 2009/0043823 A1 | 2/2009 | Iftode et al. |
| 2009/0067440 A1 | 3/2009 | Chadda et al. |
| 2009/0106255 A1 | 4/2009 | Lacapra et al. |
| 2009/0150593 A1 | 6/2009 | Hamilton et al. |
| 2009/0157846 A1 | 6/2009 | Shimozono et al. |
| 2009/0182835 A1 | 7/2009 | Aviles et al. |
| 2009/0182836 A1 | 7/2009 | Aviles et al. |
| 2009/0182945 A1 | 7/2009 | Aviles et al. |
| 2009/0222509 A1 | 9/2009 | King et al. |
| 2009/0240784 A1 | 9/2009 | Soltis |
| 2009/0271412 A1 | 10/2009 | Lacapra et al. |
| 2009/0300739 A1 | 12/2009 | Nice et al. |
| 2009/0319586 A1 | 12/2009 | Clifton et al. |
| 2010/0023674 A1 | 1/2010 | Aviles |
| 2010/0054129 A1* | 3/2010 | Kuik .................. H04L 47/10 |
| | | 370/235 |
| 2010/0082774 A1 | 4/2010 | Pitts |
| 2010/0083675 A1 | 4/2010 | Merritt |
| 2010/0095348 A1* | 4/2010 | Foster .................. G06F 21/6236 |
| | | 726/1 |
| 2010/0121945 A1 | 5/2010 | Gerber et al. |
| 2010/0217869 A1 | 8/2010 | Esteban et al. |
| 2010/0274825 A1* | 10/2010 | Nemoto .................. G06F 16/119 |
| | | 707/812 |
| 2010/0274981 A1 | 10/2010 | Ichikawa |
| 2010/0293412 A1 | 11/2010 | Sakaguchi et al. |
| 2010/0312861 A1 | 12/2010 | Kolhi et al. |
| 2010/0332401 A1 | 12/2010 | Prahlad et al. |
| 2011/0016085 A1 | 1/2011 | Kuo et al. |
| 2011/0022812 A1 | 1/2011 | Van et al. |
| 2011/0055299 A1 | 3/2011 | Phillips |
| 2011/0066668 A1 | 3/2011 | Guarraci |
| 2011/0082836 A1 | 4/2011 | Wang et al. |
| 2011/0138116 A1 | 6/2011 | Lipinski et al. |
| 2011/0184907 A1 | 7/2011 | Schrock et al. |
| 2011/0196842 A1 | 8/2011 | Timashev et al. |
| 2011/0213158 A1 | 9/2011 | Leventhal et al. |
| 2011/0231458 A1* | 9/2011 | Sutoh .................. G06F 16/185 |
| | | 707/827 |
| 2011/0289287 A1 | 11/2011 | Yamamoto et al. |
| 2011/0320436 A1 | 12/2011 | Hokanson |
| 2012/0005193 A1 | 1/2012 | Nemoto et al. |
| 2012/0011176 A1 | 1/2012 | Aizman |
| 2012/0011254 A1 | 1/2012 | Jamjoom et al. |
| 2012/0016838 A1 | 1/2012 | Arai et al. |
| 2012/0041829 A1 | 2/2012 | Rothschild et al. |
| 2012/0059864 A1 | 3/2012 | Bandyopadhyay et al. |
| 2012/0102286 A1 | 4/2012 | Holt et al. |
| 2012/0117328 A1 | 5/2012 | Mckean et al. |
| 2012/0131289 A1* | 5/2012 | Taguchi .................. G06F 3/0635 |
| | | 709/213 |
| 2012/0143825 A1 | 6/2012 | Boehm et al. |
| 2012/0150799 A1 | 6/2012 | Matsuzawa |

(56) References Cited

U.S. PATENT DOCUMENTS

| | | |
|---|---|---|
| 2012/0324110 A1 | 12/2012 | Kohli |
| 2013/0007216 A1 | 1/2013 | Fries et al. |
| 2013/0019301 A1 | 1/2013 | Reddy et al. |
| 2013/0036128 A1 | 2/2013 | Ben-Tsion et al. |
| 2013/0054530 A1 | 2/2013 | Baker et al. |
| 2013/0097680 A1 | 4/2013 | Bendapudi et al. |
| 2013/0110778 A1 | 5/2013 | Taylor et al. |
| 2013/0132544 A1 | 5/2013 | Krishnan et al. |
| 2013/0155902 A1 | 6/2013 | Feng et al. |
| 2013/0227048 A1 | 8/2013 | Xie et al. |
| 2013/0290542 A1 | 10/2013 | Watt et al. |
| 2013/0322298 A1 | 12/2013 | Alexander, Jr. et al. |
| 2013/0325804 A1 | 12/2013 | Bachar et al. |
| 2013/0332612 A1 | 12/2013 | Cai et al. |
| 2013/0339547 A1 | 12/2013 | Nath et al. |
| 2014/0052812 A1 | 2/2014 | Ozawa |
| 2014/0059013 A1 | 2/2014 | Chao et al. |
| 2014/0129667 A1 | 5/2014 | Ozawa |
| 2014/0133577 A1 | 5/2014 | Lim et al. |
| 2014/0165176 A1 | 6/2014 | Ow |
| 2014/0298454 A1 | 10/2014 | Heng et al. |
| 2015/0019479 A1 | 1/2015 | Buehne et al. |
| 2015/0020059 A1 | 1/2015 | Davis |
| 2015/0207872 A1 | 7/2015 | Stiemerling et al. |
| 2015/0356078 A1 | 12/2015 | Kishimoto et al. |
| 2015/0373105 A1 | 12/2015 | Okada et al. |
| 2016/0004720 A1 | 1/2016 | Tabaaloute et al. |
| 2016/0041995 A1 | 2/2016 | Prinz, III et al. |
| 2016/0041996 A1 | 2/2016 | Prinz, III et al. |
| 2016/0179795 A1 | 6/2016 | Beard et al. |
| 2016/0246648 A1 | 8/2016 | Kamath et al. |
| 2016/0321338 A1* | 11/2016 | Isherwood .......... G06F 11/2094 |
| 2021/0109890 A1 | 4/2021 | Prinz, III et al. |

OTHER PUBLICATIONS

International Search Report and Written Opinion for Application No. PCT/US2014/053011 dated Dec. 11, 2014, 10 pages.

Li J., et al., "Managing Data Retention Policies at Scale," Network and Service Management, IEEE Transactions on, Browse Journals & Magazines Network & Service Man, vol. 9 (4), Oct. 19, 2012, pp. 393-406.

Microsoft Computer Dictionary, Fifth Edition (5th ed.), Microsoft Press, Redmond, WA, USA, 2002, p. 348.

Pawlowski B., et al., "NFS Version 3: Design and Implementation," In Proceedings of the Summer 1994 USENIX Technical Conference, URL: http://people.cs.pitt.edu/-manas/courses/2510/nfs3.pdf, 1994, 15 pages.

Reed B.C., et al., "Security Considerations When Designing a Distributed File System Using Object Storage Devices,"FirstInternational Security in Storage Workshop, URL: http://ieeexplore.ieee.org/stamp/stamp.jsp? tp=&arnumber=1183507, 2002, pp. 24-34.

Veeraraghavan K., et al., "DoublePlay: Parallelizing Sequential Logging and Replay," Journal ACM Transactions Computer Systems (TOGS), Special Issue APLOS 2011 TOGS Homepage archive, vol. 30 (1), Feb. 2012, p. 3:1 -3:24.

You I., "On Asynchronous Enforcement of Security Policies in "Nomadic" Storage Facilities," Published in: Industrial Electronics (ISIE), 2013 IEEE International Symposium on, May 28-31, 2013, pp. 1-6.

Zhou, et al., "The Multi-Queue Replacement Algorithm for Second Level Buffer Caches," Proceedings of the 2001 USENIX Annual Technical Conference, Jun. 2001, 15 pages.

\* cited by examiner

SYSTEM AND METHOD FOR DEVELOPING AND IMPLEMENTING A MIGRATION PLAN FOR MIGRATING A FILE SYSTEM

CROSS-REFERENCE TO RELATED APPLICATIONS

This application is (i) a continuation of U.S. patent application Ser. No. 14/981,818, filed Dec. 28, 2015, and entitled "SYSTEM AND METHOD FOR DEVELOPING AND IMPLEMENTING A MIGRATION PLAN FOR MIGRATING A FILE SYSTEM"; (ii) a continuation of U.S. patent application Ser. No. 14/456,991, filed Aug. 11, 2014, and entitled "SYSTEM AND METHOD FOR DEVELOPING AND IMPLEMENTING A MIGRATION PLAN FOR MIGRATING A FILE SYSTEM"; and (iii) a continuation of U.S. patent application Ser. No. 14/456,978, filed Aug. 11, 2014, and entitled "SYSTEM AND METHOD FOR PLANNING AND CONFIGURING A FILE SYSTEM MIGRATION"; the aforementioned priority applications being hereby incorporated by reference in their respective entireties for all purposes.

This application incorporates by reference the following applications: (i) U.S. patent application Ser. No. 14/011,699, filed Aug. 27, 2013, and entitled "SYSTEM AND METHOD FOR ASYNCHRONOUS REPLICATION OF A NETWORK-BASED FILE SYSTEM"; (ii) U.S. patent application Ser. No. 14/011,696, filed Aug. 27, 2013, and entitled "ASYNCHRONOUSLY MIGRATING A FILE SYSTEM"; (iii) U.S. patent application Ser. No. 14/011,719, filed Aug. 27, 2013, and entitled "SYSTEM AND METHOD FOR MIGRATING DATA FROM A SOURCE FILE SYSTEM TO A DESTINATION FILE SYSTEM WITH USE OF ATTRIBUTE MANIPULATION"; (iv) U.S. patent application Ser. No. 14/011,718, filed Aug. 27, 2013, and entitled "DETECTING OUT-OF-BAND (OOB) CHANGES WHEN REPLICATING A SOURCE FILE SYSTEM USING AN IN-LINE SYSTEM"; (v) U.S. patent application Ser. No. 14/011,723, filed Aug. 27, 2013, and entitled "SYSTEM AND METHOD FOR IMPLEMENTING DATA MIGRATION WHILE PRESERVING SECURITY POLICIES OF A SOURCE FILER"; all of the preceding priority applications being hereby incorporated by reference in their respective entirety.

TECHNICAL FIELD

Examples described herein relate to network-based file systems, and more specifically, to a system and method for planning and configuring migrations amongst file systems.

BACKGROUND

Network-based file systems include distributed file systems which use network protocols to regulate access to data. Network File System (NFS) protocol is one example of a protocol for regulating access to data stored with a network-based file system. The specification for the NFS protocol has had numerous iterations, with recent versions NFS version 3 (1995) (See e.g., RFC 1813) and version 4 (2000) (See e.g., RFC 3010). In general terms, the NFS protocol allows a user on a client terminal to access files over a network in a manner similar to how local files are accessed. The NFS protocol uses the Open Network Computing Remote Procedure Call (ONC RPC) to implement various file access operations over a network.

Other examples of remote file access protocols for use with network-based file systems include the Server Message Block (SMB), Apple Filing Protocol (AFP), and NetWare Core Protocol (NCP). Generally, such protocols support synchronous message-based communications amongst programmatic components.

Commercially available network-based file systems are implemented through software products, such as operating systems marketed under DATA ONTAP 7G, GX, or 8 (sometimes referred to as "7-MODE") and CLUSTERED DATA ONTAP (sometimes referred to as "cDOT"), which are manufactured by NETAPP INC. Other commercial examples of network based file systems include ISILON and VNX, which are manufactured by EMC.

With changes to business needs and development in technology, enterprise operators sometimes elect to change their network file system. For example, an operator may elect to do a technical refresh of hardware resources on a network file system, and in the process, elect to implement a different file system architecture for the updated hardware resources. Under conventional approaches, tools are available to assist an operator of a network file system in migrating to a network file system architecture. Many approaches require the source file system to incur some downtime as the clients are redirected to the new file system. Typically, file system migration amongst file systems of different architecture are very labor-intensive, as administrators are required to implement various tasks and processes in order to preserve the original namespace and the various policies (including export policies) in the new destination.

DETAILED DESCRIPTION

Figure 1:
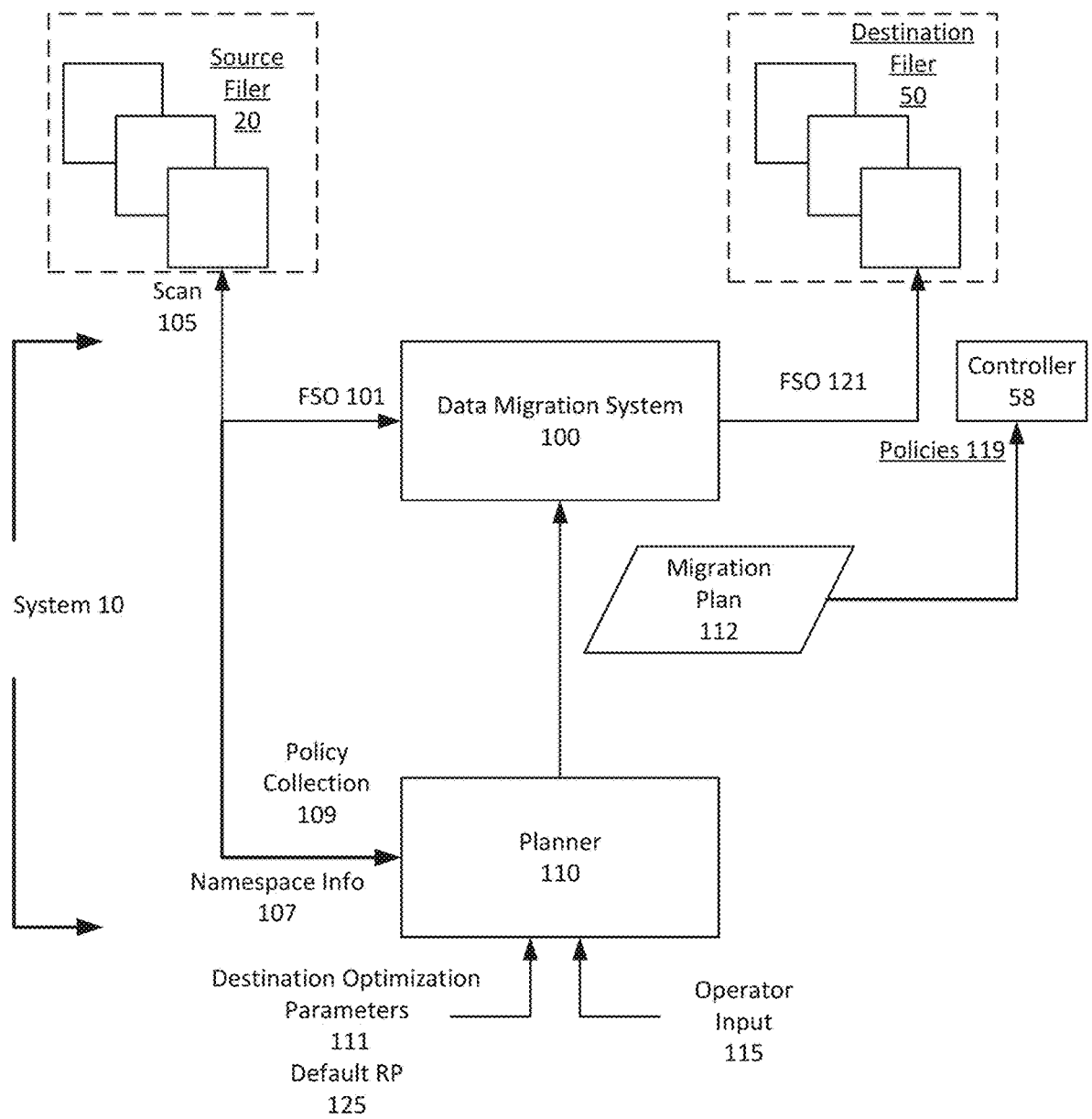
FIG. 1 illustrates a system for implementing migration of a source file system to a destination file system using a migration plan, according to an embodiment.

Embodiments described herein provide for a computer system and method for creating a migration plan for migrating a source file system to a destination file system.

Among other uses, the migration plan can incorporate operator input for configuring the structure, organization and policy implementation of the destination file system. In some embodiments, a planner operates to generate a user interface for enabling operator input to specify structure, organization and policy input for file system objects that are to be migrated to the destination filer.

Still further, in some embodiments, the migration plan facilitates the migration of file system objects as between source and destination file systems that have different architectures. Furthermore, a migration plan can be created that enables the migration to be optimized for the architecture of the destination file system.

According to one aspect, a migration plan is created that is based at least in part on an operator input. The resources of a destination file system are provisioned based on the migration plan. One or more processes to migrate the source file system for the provisioned resources of the destination file system are then configured based on the migration plan.

In still another embodiment, a migration plan is determined for a file system migration. The migration plan maps each of (i) a set of file system objects from the source file system to a corresponding set of file system objects at the destination file system, and (ii) a source policy collection for the set of file system objects to a destination policy collection for the corresponding set of file system objects as the destination file system. Additionally, the migration plan includes a set of parameters that are based at least in part on an operator input. The migration of the file system objects can be implemented using the migration plan, with the migration plan specifying, for at least a first object container of the corresponding set of file system objects at the destination file system, at least one of a file contextual path, type, or policy implementation relating to the first object container, that is different as compared to a file path, type or policy implementation of a corresponding source object container of the set of file system objects of the source file system.

In still another embodiment, a migration plan is determined for the file system migration. The migration plan includes a set of parameters and a set of rules, including one or more parameters or rules that are based on an operator input. A namespace is determined for the source file system. The source namespace identifies a set of file system objects and a file path for each of the file system objects in the set of file system objects. A collection of source policies that are implemented for file system objects identified in the namespace of the source file system is also determined. The migration plan is used to create a namespace for the destination file system based at least in part on the namespace of the source file system. Additionally, the migration policy is used to determine a destination collection of policies for implementation on the destination file system. The destination collection of destination policies can be based at least in part on the collection of source policies. At least one of the namespace or the collection of destination policies include an operator-specific configuration that is specified by the one or more rules or parameters of the operator input.

As used herein, the terms "programmatic", "programmatically" or variations thereof mean through execution of code, programming or other logic. A programmatic action may be performed with software, firmware or hardware, and generally without user-intervention, albeit not necessarily automatically, as the action may be manually triggered.

The term "optimal" (or variants such as "optimized" or "optimum") means through the use of intelligent considerations to make more optimal than otherwise without such considerations. Thus, the use of the term "optimize" or "optimized", for example, in reference to a given process or data structure does not necessarily mean a process or structure that is the most optimal or the best. The basis for optimum can include performance, efficiency, effectiveness (e.g., elimination of redundancy) and/or cost.

An "architecture" of a network file system can be characterized by an operating system level component that structures the file system and implements the protocol(s) for operating the file system. Among other tasks, the operating software of a given architecture structures the namespace and the policies that affect the namespace. In the context provided, the term "structuring" and variants thereof refers to both a format and a logical structure.

One or more embodiments described herein may be implemented using programmatic elements, often referred to as modules or components, although other names may be used. Such programmatic elements may include a program, a subroutine, a portion of a program, or a software component or a hardware component capable of performing one or more stated tasks or functions. As used herein, a module or component can exist in a hardware component independently of other modules/components or a module/component can be a shared element or process of other modules/components, programs or machines. A module or component may reside on one machine, such as on a client or on a server, or may alternatively be distributed among multiple machines, such as on multiple clients or server machines. Any system described may be implemented in whole or in part on a server, or as part of a network service. Alternatively, a system such as described herein may be implemented on a local computer or terminal, in whole or in part. In either case, implementation of a system may use memory, processors and network resources (including data ports and signal lines (optical, electrical etc.)), unless stated otherwise.

Furthermore, one or more embodiments described herein may be implemented through the use of instructions that are executable by one or more processors. These instructions may be carried on a non-transitory computer-readable medium. Machines shown in figures below provide examples of processing resources and non-transitory computer-readable mediums on which instructions for implementing one or more embodiments can be executed and/or carried. For example, a machine shown for one or more embodiments includes processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on many cell phones and tablets) and magnetic memory. Computers, terminals, and network-enabled devices (e.g. portable devices such as cell phones) are all examples of machines and devices that use processors, memory, and instructions stored on computer-readable mediums.

System Overview

FIG. 1 illustrates a system for implementing migration of a source file system ("source filer") to a destination file system ("destination filer") using a migration plan, according to an embodiment. Among other benefits, an example of FIG. 1 enables a migration to be performed in which a resulting destination filer is optimized with respect to characteristics such as organizational structure, policy application, and resource allocation. In particular, an example of FIG. 1 enables migration of source filer to the destination filer when the source and destination filers operate under different architectures. According to an example of FIG. 1, programmatic components operate to automatically identify and optimize the manner in which file system objects are mapped from a source filer to a destination filer, so to account for semantic and logical characteristics of the destination filer. As an addition or alternative, an example of FIG. 1 enables an operator to further structure and configure the destination filer to implement changes based on need or preference in order to account for features of the destination filer and/or resources of the destination filer.

With further reference to FIG. 1, a system 10 includes a data migration system 100 and a planner 110. The data migration system 100 and planner 110 operate to migrate file system objects 101 from a source filer 20 to a destination filer 50. Among other functions, the planner 110 operates to (i) discover structure, organization and policies of the source filer 20 from which migration is to be initiated, (ii) provision the destination filer 50 for structure and organization, such as to type and location of object containers, and (iii) implement a policy collection 119 on the destination filer 50 that is based on the discovered policies of the source filer 20. Additionally, the planner 110 can publish a migration plan for use by the data migration system 100 to perform the migration as session-based tasks.

In some embodiments, the planner 110 provides a mechanism to enable operator input to (i) select portions of the source filer for migration, (ii) configure or alter the provisioning of the destination filer, such as by way of changing container types or file paths, and (iii) altering the destination's policy collection 119 relative to a policy collection 109 of the source filer 20.

Still further, the planner 110 can include rules and other logic to optimize the destination filer 50. In particular, the resources of the destination filer can be provisioned in a manner that optimizes implementation of the migrated file system to account for characteristics and functionality of the destination filer 50, as well as preferences and needs of the operator. As described with some examples, the source filer 20 and destination filer 50 can optionally operate under different system architectures. In such implementations, the planner 110 can provision the destination filer 50 to, for example, change the type of select containers when the migration is performed in order to leverage additional configurability and functionality available to the particular container type on the architecture of the destination filer 50. enable more operator configurability. The planner 110 can also define policies of a destination policy collection 119 in order to account for the architecture of the destination filer 50.

In more detail, the planner 110 receives, as input, a namespace 107 and policy collection 109 of the source file system 20. The namespace 107 can be determined from, for example, one or more programmatic resource that perform discovery on the source filer 20. In the example of FIG. 1, the data migration system 100 can include one or more components that implement operations to discover file system objects, including interfacing with log files and other resources of the source file system 20 in order to determine the namespace 107. In a variation, the planner 110 can execute processes to interface with export files and other policy stores or resources of the source filer 20 in order to determine the source policy collection 109.

The planner 110 can also receive operator input 115 (e.g., via a user-interface), which identifies preferences of an operator (e.g., administrator). As described below, the operator input 115 can include input to (i) select containers or portions of the source filer 20 to migrate, (ii) specify a container type and/or organization for a select or global number of containers in the destination filer 50, and/or (iii) specify policy configurations and changes for the file system when migrated onto the destination filer 50. Still further, in some embodiments, the planner 110 can include a default set of rules and parameters 125, which are selected or otherwise based on the architecture of the source filer 20 and the architecture of the destination filer 50. The default set of rules and parameters 125 can determine how file system objects from the source filer 20 map to the destination filer 50. The default set of rules and parameters 125 can include considerations for optimizing the destination architecture. In particular, the default set of rules and parameters 125 (i) determine the structure and organization of the migrated file system objects on the destination filer 50, and (ii) define the policies of the destination policy collection 119 for application on the file system objects of the destination filer 50. Accordingly, the default set of rules and parameters 125 can include logic for provisioning the destination filer 50 and for implementing the migration as between the source filer 20 and the destination filer 50 when the source and destination utilize different architectures.

In this way, planner 110 operates to generate the migration plan 112, which in turn is used to provision the destination filer 50. Once the migration is complete, the structure and organization of the file system objects in the destination filer 50 can be dictated by the manner in which the destination filer 50 was provisioned through use of the migration plan 112.

As described with other examples, the policies of the destination policy collection 119 can be formatted and logically structured based on operator input 115 and/or optimization considerations of the destination filer 50. The optimization considerations for the destination policy collection 119 can be based in part on optimization characteristics of the architecture of the destination filer 50. Thus, the destination policy collection 119 can differ in format and structure from the corresponding policy collection 109 of the source filer 20. By way of example, the policy collections 109, 119 of the respective source and destination filers 20, 50 can include policy sets for exports, quotas, storage efficiency and backup.

In operation, the planner 110 operates to generate the migration plan 112 based on the default set of rules and parameters 125 and/or the operator input 115. In one implementation, the migration plan 112 is communicated in whole or in part to the data migration system 100. The data migration system 100 uses the migration plan to implement the migration. In one implementation, the migration plan 112 is published for the data migration system 100, and the data migration system replicates file system objects for inclusion in containers that are identified or specified by the migration plan. The data migration system 100 can operate on a session-basis that is defined in part by specific containers provisioned on the destination filer 50. The sessions of the data migration system 100 can also be automated and/or sequenced, so that some or all of the migration can be performed in autonomous fashion once the migration plan 112 is published.

Among other tasks, the planner 110 and data migration system 100 combine to allocate aggregates of the source filer 20 as being migrated amongst hardware resources in accordance with default settings or preferences of the user. For example, the data migration system 100 can determine the logical interfaces (LIF) for accessing aggregates of the source file system 20 being migrated. The LIF determination can specify routes and resources for aggregates based on considerations such as expected traffic for aggregates and minimizing communication hops.

The data migration system 100 can replicate file system objects 101 of the source filer 20 as destination file system objects 121. According to some embodiments, the data migration system 100 uses information from the migration plan 112 (e.g., destination namespace) in order to replicate file system objects for the containers of the destination filer 50. In this way, the replication of the file system objects 101 results in the generation of destination file system objects 121 which are stored in containers of type and organization specified by the migration plan 112.

In one embodiment, the object containers of the destination file system 50 can include volumes, quota trees ("qtree") or directories. In one implementation, the object containers map in type and organization to that which is discovered from the source filer 20, unless operator input 115 is recorded to alter the default set of rules and parameters 125 of the migration plan 112. In one implementation, the operator-input can change both type and relative location of individual containers on the destination filer 50, as compared to provisioning using the default set of rules and parameters 125. Still further, in one implementation, the destination filer 50 is provisioned with the destination namespace, as provided by the migration plan 112. Additionally, the data migration system 100 uses the object containers of the destination filer 50 to replicate file system objects onto the destination filer.

Other organization aspects of file system objects 101 can also be determined on the destination file system by either default or by operator input. For example, absent operator input, the containers of the destination filer 50 can be structured and organized to preserve the granularity and organization of the source filer 20. The organizational aspects of the containers in the destination filer 50 can be based on their respective file path, as provided on the source filer 20. The destination filer 50 can be provisioned to generate the containers so that they include equivalent context file paths, meaning that the file paths provided with the container objects of the destination filer 50 include a common segment (which includes the leaf node of the file path) with the file path of the counterpart object container at the source filer 20. The migration plan 112 can use operational input 115 or other input in order to alter the context file paths of the destination containers. For example, when the file path of an object container at the source filer 20 is shown to embed that object container within another container type, operator input 115 can specify that that the two containers occupy the same hierarchy level when provisioned on the destination filer 50.

The data migration system 100 can also implement the policy collection specified by the migration plan 112 using for example, one or more controllers (shown as "controller 58") of the destination filer 50. The controller 58 can represent one or multiple hardware and/or software components for controlling aspects of the destination filer 50. For example, in an implementation in which the destination filer 50 is a cDOT architecture, the policy management may be conducted through use of a Storage Virtual Machine (or "SVM"). Accordingly, one implementation provides for the migration plan 112 to be communicated to the controller 58 of the destination filer 50 in order to create the policy rules and statements that comprise the policy collection 119, specified by the migration plan 112 for the destination filer 50. When the migration is performed by the data migration system 100, the controller 58 applies the destination policy collection 119.

Figure 2:
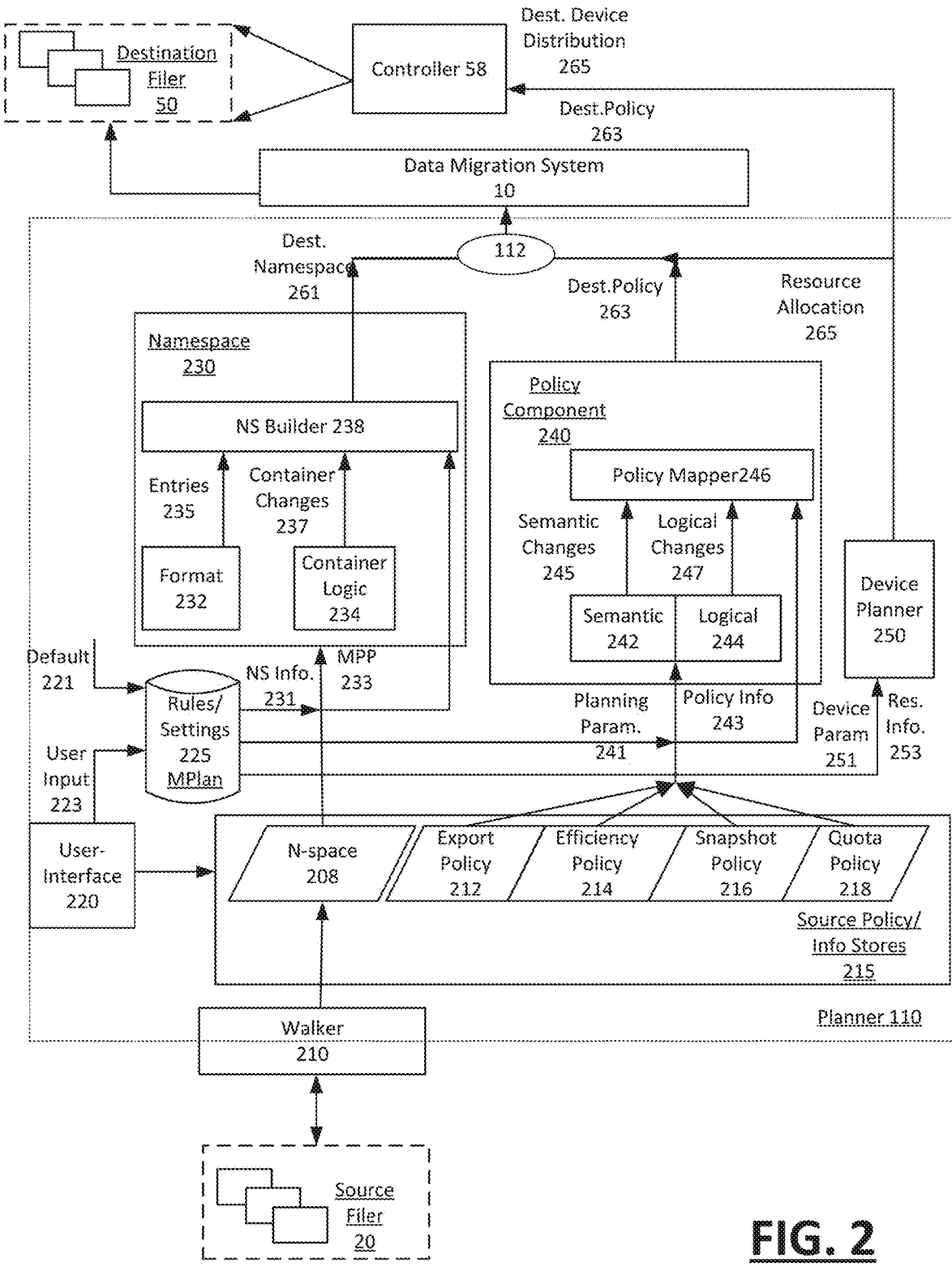
FIG. 2 illustrates a migration planning system for use in migrating file system objects from a source filer to a destination filer, according to an embodiment.

FIG. 2 illustrates a migration planning system for use in migrating file system objects from a source filer to a destination filer, according to an embodiment. In particular, FIG. 2 provides example components for implementing planner 110, as also described with an example of FIG. 1, the planner 110 includes a user interface 220, a namespace component 230, a policy component 240 and a device or resource planner 250.

A walker 210 can operate as part of, or with the planner 110, in order to determine source information 215. The walker 210 can execute a process that interfaces with various resources of the source filer 20 in determining the source information stores 215. In one implementation, the walker 210 can implement a REST interface to access log or health files, such as generated through "autosupport" (or "ASUP") mechanisms of ONTAP-based network file systems. By way of example, the walker 210 can utilize log or health files to identify file system objects and structural (e.g. type) or organizational information (e.g., file paths) about the file system objects of the source filer 20. As an addition or alternative, the walker 210 interfaces with policy servers and stores of the source file system 20 in order to determine the policies of the file system objects being migrated. By way of example, in one implementation, the walker 210 includes a process that executes through the planner 110 and executes a Zephyr Application Program Interface (ZAPI) to locate and extract export files of the source filer 20. The export files can identify policies that exist on the source filer for file system objects and portions (e.g., volumes) of the source filer 20.

In one implementation, the source information stores 215 can include a source namespace 208, an export policy store 212, an efficiency policy store 214, a snapshot policy store 216 and a quota policy store 218. The namespace 208 identifies file system objects (e.g., by inode) and their respective type, as well as file path information for the objects. In one implementation, the information of the namespace is determined primarily from log health files of the source filer 20. Information for the export policy store 212, efficiency policy store 214, snapshot policy store 216 and quota policy store 218 can be obtained from, for example, the walker 210 locating and obtaining export files and related data from controllers and policy resources of the source filer 20.

In one implementation, the planner 110 includes a plan store 225 for aggregating parameters and data corresponding to a migration plan. Some of the parameters and data of the plan store 225 can be determined by default, based on, for example, the source and destination filers 20, 50. Other parameters and data of plan store 225 can be obtained from operator input 223, provided through, for example, the user interface 220. In one implementation, the user interface 220 utilizes source information 215, such as information from the namespace store 208, in order to generate prompts and contextual information for enabling operator input 223. The operator input 223 can be stored as parameters in the plan store 225. Among other applications, plan store 225 can be used to (i) generate a destination namespace, (ii) create and configure or modify file system objects (e.g., containers) identified for the destination filer 50, (iii) create policy statements for application of a policy collection on file system objects at the destination filer 50 (as identified in the destination namespace), and/or (iv) provision the destination filer 50 and/or its resources for migration of file system objects from the source filer 20.

In an embodiment, the namespace component 230 of the planner 110 receives source namespace information 231 from the namespace store 208. Additionally, the namespace component 230 receives migration planning parameters 233 from the plan store 225. The namespace component 230 can include programming and logic to enable establishment of a destination namespace 261 for the destination filer 50 using the source namespace information 231 (e.g., namespace entries). In one implementation, the destination namespace 261 is generated for a migration in which the destination filer 50 is of a different architecture than that of the source filer 20.

In one embodiment, the namespace component 230 can include a format component 232, container logic 234 and namespace builder 236. The format component 232 implements formatting rules for reformatting namespace entries specified in the source namespace information 231 into namespace entries 235 that have a format of the destination architecture. In one implementation, an individual source namespace entry includes a file path and identifier in a first format (e.g., 7-MODE) of the source architecture, and the format component 232 restructures the file path and identifier into a second format of the destination architecture (shown by entries 235). The reformatting of the file path and identifiers can include both syntax and semantic changes.

The container logic 234 includes rules and other logic for specifying a change to an object container. In particular, the container logic 234 can be configured by parameters to change container types of select object containers identified in the source namespace information 231. For example, a container as identified by the source namespace information 231 can be changed in type based on planning parameters 233, which can be determined by the operator input 223. In one implementation, operator-selected object containers specified in the source namespace information 231 can be converted from q-trees or directories to volumes. The parametric configuration of the container logic 234 can be set by default (e.g., container logic 234 keeps original container types) or by operator input 223. In one implementation, the operator input 223 can, for example, specify specific (e.g., container-specific) or global changes to container types (e.g., change some or all q-trees to volumes). Accordingly, in one implementation, parameters that specify conversion of select object containers are received by user input provided through the user interface 220. Alternatively, the parameters can correspond to a global selection that applies to object containers of a specific type in a particular source.

In one implementation, the namespace builder 238 receives (i) reformatted namespace entries 235 provided by the format component 232, and (ii) identification of object containers and type from the container logic 234. The reformatted namespace entries and object containers can be determined in part from the source namespace information 231, using the namespace migration parameters 233 as provided from the plan store 225. Based on the input, the namespace builder 238 can generate a destination namespace 261. The namespace builder 238 can also include logic to optimize the destination namespace 261 by structure or formatting.

The destination namespace 261 can be used to provision the destination filer 50. Additionally, the destination namespace 261 can configure the data migration system 100 in populating the containers of type and organization specified in the destination namespace 261.

According to one example, the policy component 240 of the planner 110 includes a format component 242, a logical component 244 and a policy mapper 246. The policy component 240 receives policy information 243 from the source information 215. Additionally, the policy component 240 receives planning parameters 241 from the plan store 225. The planning parameters 241 can be based on user input 223, received through the user interface 220. As an addition or variation, the planning parameters 241 can correspond to a default set of parameters.

The policy component 240 generates policy collections 263 of different types for the destination filer 50. For example, the policy collections 263 can include export policies, efficiency policies, snapshot policies and quota policies. The architecture of the destination filer 50 can require different formatting and logical structures for each kind of policy. For some types of policies, the format and logical structure as between the source and destination architectures may be the same, and for other policy types, the format and logical structure may be different.

The policy format component 242 operates to restructure and format policies 243 as provided from the source information 215. The policies 243 can be reformatted or structured for syntax and semantic structure. The logical component 244 can apply cluster or group operations on select kinds of policy collections in order to determine logically equivalent policy sets. In particular, the logical component 244 can include logic to combine, for example, equivalent or identical policies to reduce, thereby reducing the policy count for the destination filer 50. For example, a cluster of export policy statements can be represented by a single policy statement in the corresponding policy collection 263. The policy mapper 246 can store the policy collections 263 on the destination filer 50 when, for example, the destination filer 50 is provisioned.

The resource planner 250 can plan for hardware and resource allocation of the destination filer 50, given resource information 253 and operator-specified allocation parameters 251. The resource information 255 can include usage information, which can be determined or estimated from, for example, the operator for aggregates of the file system being migrated. For example, the resource information 255 can be determined from health logs of the source filer 20 or from manual input (e.g., operator identifies aggregates of the source filer with the most traffic or least traffic). The allocation parameters 251 can include specified by the operator via the user interface 220 (operator input 223). As an addition or alternative, the allocation parameters 251 can include default parameters or rules which can be provided by the plan store 225.

The resource planner 250 can generate resource allocation data 265 (e.g., instructions, parameters) to allocate and configure hardware and logical resources on the destination filer 50. The allocation and configuration of hardware resources can be to optimize performance and balance loads. In one implementation, the resource allocation data 265 assign specific objects to aggregates of the file system being migrated based on expected traffic. For example, those objects on the source filer 20 with the most traffic can be assigned to high-performance resources when migrated to the destination filer 50, while other objects that had history of less demand receive low cost resources on the destination filer 50.

As an addition or alternative, the allocation instructions 265 can also generate a topology that identifies the location of aggregates on nodes of the destination filer 50. The topology can specify hardware driven paths to aggregates of the destination filer, which can be determined by the presence of logical interfaces (LIFs) amongst the nodes of the destination architecture. Specifically, each LIF on the destination filer 50 provides an address (e.g., IP address) to a physical port, and the allocation instructions 265 can select paths amongst physical ports of the destination filer through LIF selection. By way of example, the network paths can be shortened (e.g., fewer hops), for file system objects and containers that are most heavily used.

As shown by an example of FIG. 2, the planner 110 operates to provision and ready the destination filer 50, and to configure the data migration system 100. As a result, the destination filer 50 is intelligently configured when put in use after migration, with minimal effort from the operator.

With respect to examples such as described with FIG. 1 and FIG. 2, the data migration system 100 can operate asynchronously and seamlessly, so as to support multiple clients what actively use file system objects being migrated while those file system objects are replicated from the destination filer 50. According to some embodiments, the data migration system 100 can be implemented in accordance with migration systems such as described with U.S. patent application Ser. Nos. 14/011,699, 14/011,696, 14/011,719, 14/011,718 and 14/011,723; all of the aforementioned applications being owned by the assignee of this application and further being incorporated by reference in their respective entirety.

Methodology

Figure 3:
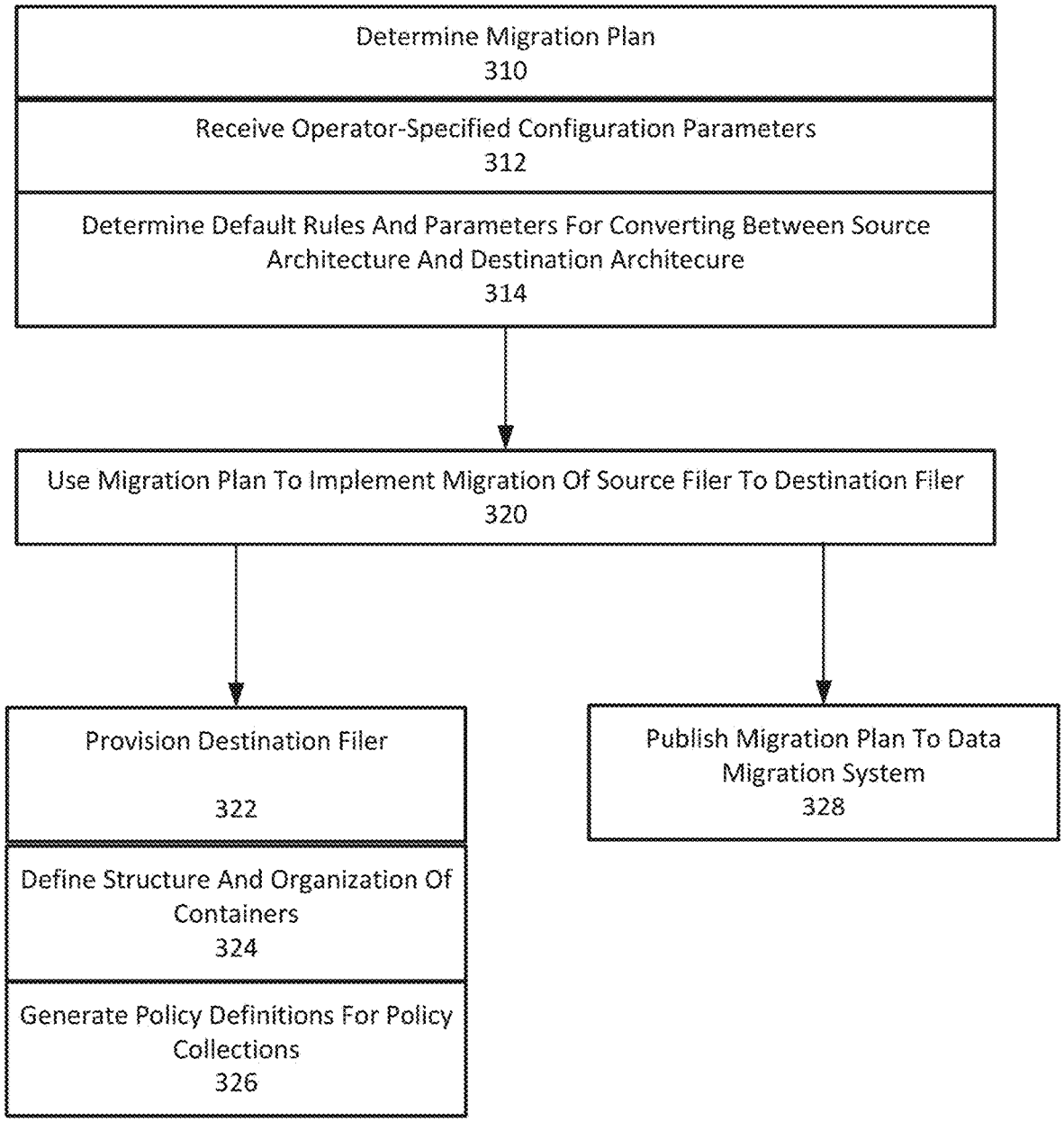
FIG. 3 illustrates an example method for using a migration plan to migrate a file system onto a destination filer, according to an embodiment.
Figure 4:
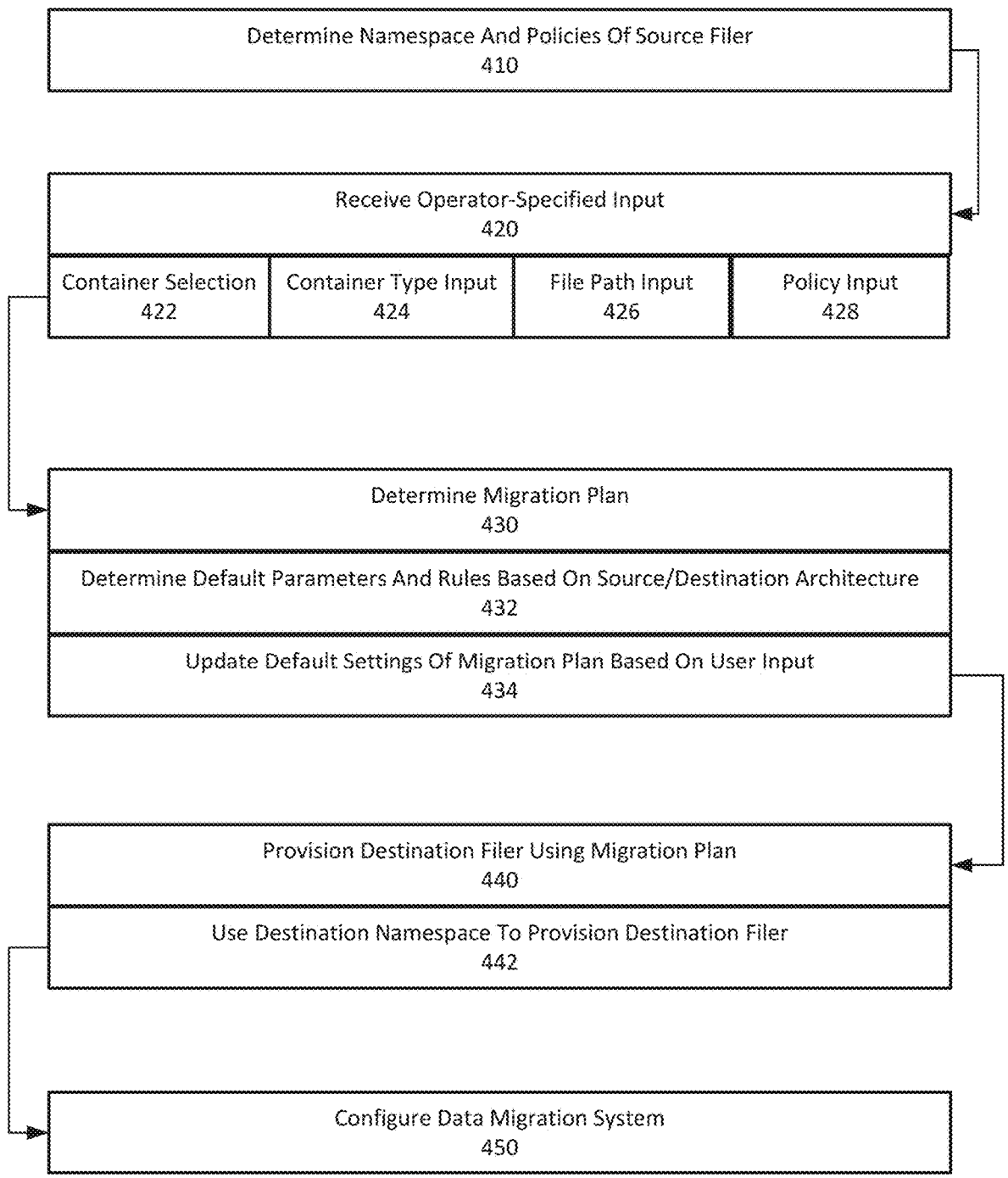
FIG. 4 illustrates an example method for developing a migration plan using operator input, according to an embodiment.
Figure 5:
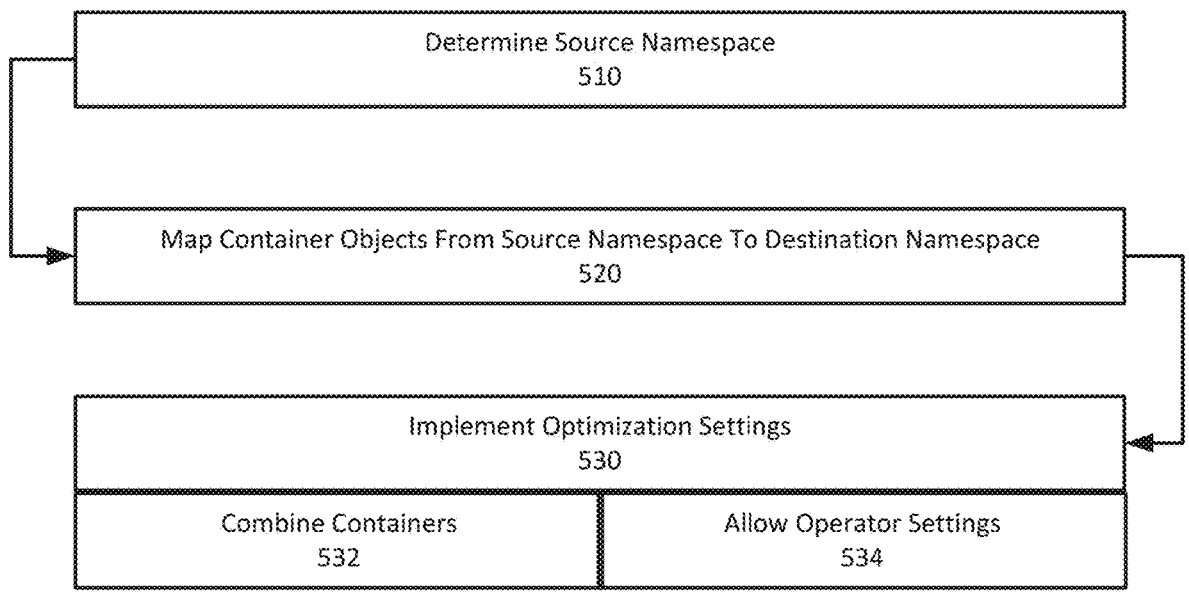
FIG. 5 illustrates an example method for implementing a selective migration of a source filer with alterations to how container objects are migrated, according to an embodiment.
Figure 6:
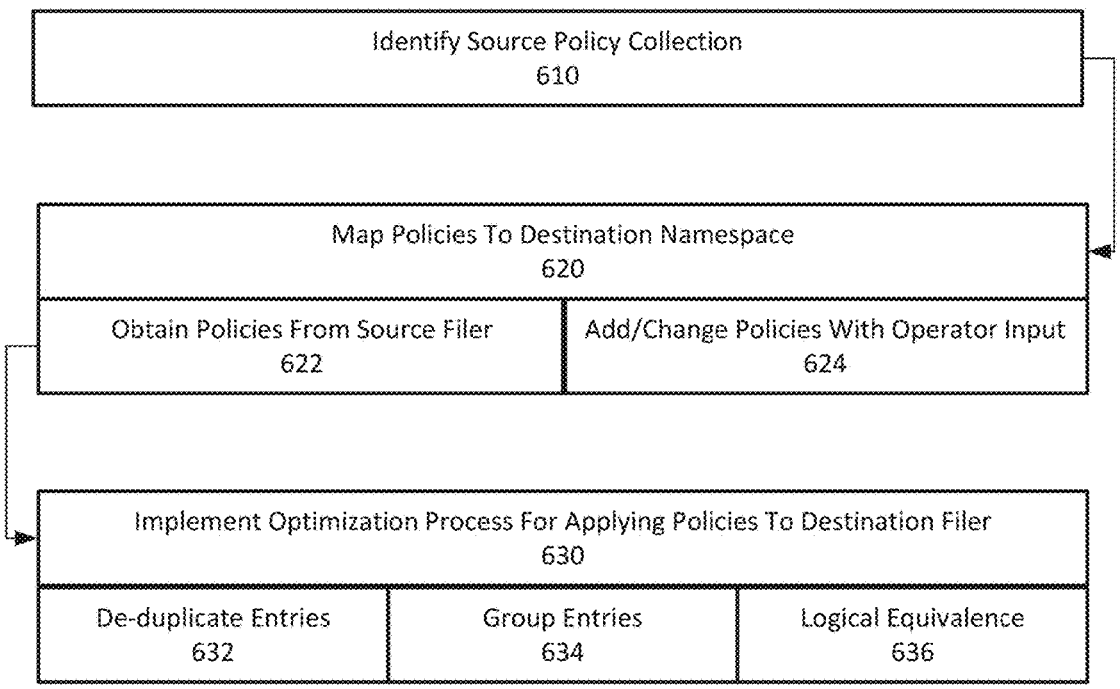
FIG. 6 illustrates a method for mapping policies of a source filer to that of a destination filer, according to an embodiment.
Figure 7:
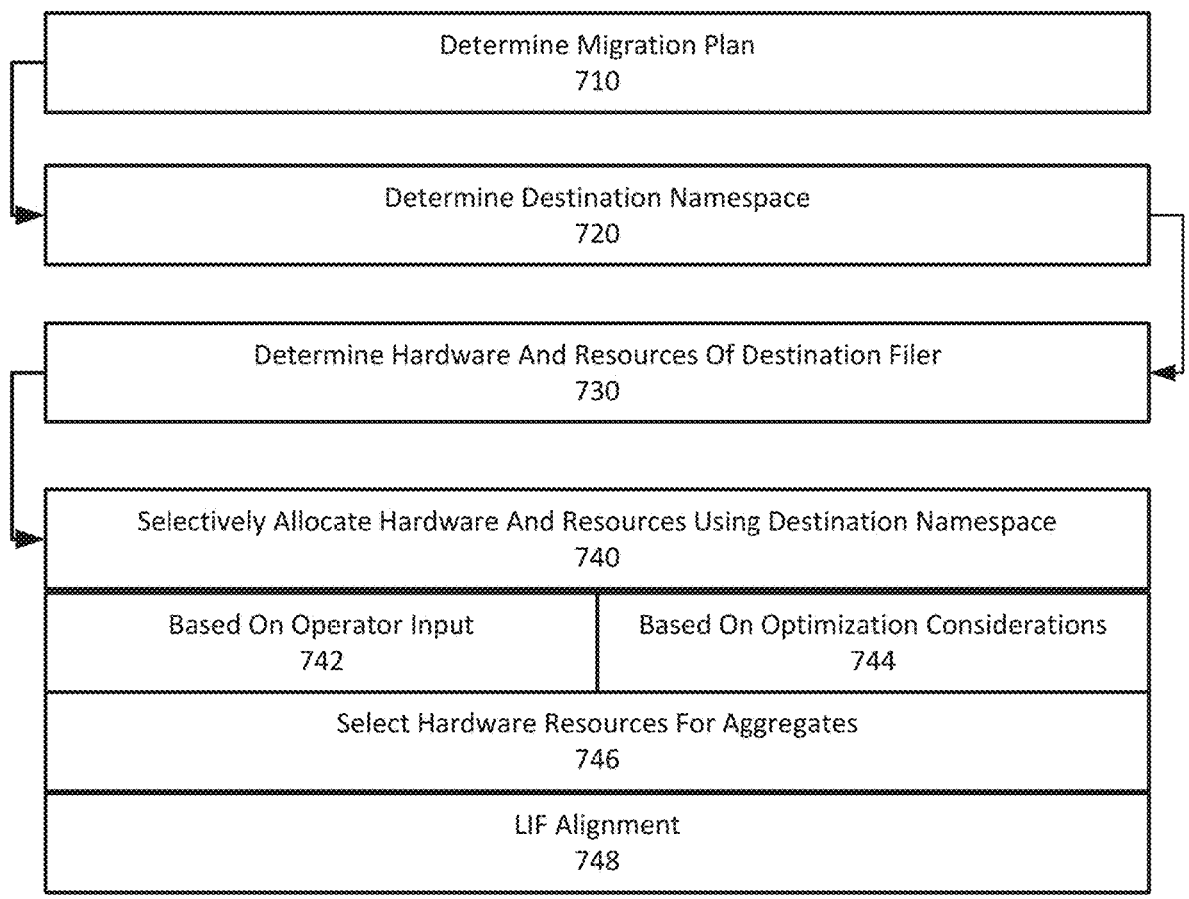
FIG. 7 illustrates a method for allocating resources of a destination filer based on a migration plan, according to an embodiment.

FIG. 3 illustrates an example method for using a migration plan to migrate a file system onto a destination filer, according to an embodiment. FIG. 4 illustrates an example method for developing a migration plan using operator input, according to an embodiment. FIG. 5 illustrates an example method for implementing a selective migration of a source filer with alterations to how container objects are migrated, according to an embodiment. FIG. 6 illustrates a method for mapping policies of a source filer to that of a destination filer, according to an embodiment. FIG. 7 illustrates a method for allocating resources of a destination filer based on a migration plan, according to an embodiment. Methods such as described with examples of FIG. 2 or FIG. 3 can be implemented using, for example, a system such as described with an example of FIG. 1 or with FIG. 2. Accordingly, examples described by FIG. 3 through FIG. 7 can be implemented in context such as described with FIG. 1 or FIG. 2, including an example in which a source and destination filer operate under different architectures. In describing examples of FIG. 2 through FIG. 7, reference may be made to examples of FIG. 1 or FIG. 2 for purpose of illustrating a suitable component for performing a step or sub-step being described.

With reference to FIG. 3, a migration plan is determined (310). The planner 110 can generate the migration plan 112 using a combination of default rules and logic, as well as operator-specified input. The migration plan 112 can also be specific to the architecture type of the source and destination filers 20, 50, to enable the migration to occur between architectures of different types.

In one implementation, the planner 110 includes a user interface 220 that prompts for and receives operator input (312). FIG. 8A through FIG. 8D illustrate example of a user interface that can enable the operator to specify planner input that is object specific or global. As an addition or alternative, the planner 110 can utilize default rules and parameters for the migration plan 112, which can be specific to the destination filer 50 and/or the conversions needed as between the source and destination architectures (314). The operator input can change the default rules and parameters.

The migration plan 112 can then be used to implement the migration from the source filer 20 to the destination filer 50 (320). In one implementation, the migration plan 112 is used to provision the destination filer 50, and the data migration system 100 populates the destination filer 50 based on the provisioning (322). In provisioning the destination filer 50, the migration plan can define structures and organization for containers at the destination filer (324). In one implementation, the type of container can be changed (e.g., from q-tree to volume or directory). Still further, the context portion of file path of the containers at the destination filer 50 can be modified based on the settings of the migration plan 112. Thus, for example, an operator can promote a q-tree to a volume, then move the promoted volume relative to other containers.

Additionally, the migration plan can generate policy definitions for policy collections of the destination filer (326). For example, the policy component 240 can generate policy collections 263 which provides for intelligently grouping or clustering policy entries of the source filer into policy definitions of the destination filer 50.

Additionally, the migration plan 112 can be published to the data migration system 100, so as to configure operations of the data migration system (328). With the migration plan 112, the data migration system 100 can create tasks which serve to populate containers of the destination namespace (as provided with the migration plan 112) with file system objects of the source filer 20. The implementation of the task approach enables the data migration system 100 to access containers that have been modified by type and path when replicating the file system objects of those containers. Additionally, the migration plan enables the data migration system 100 to automate, time and/or sequence (including implement in parallel or back-to-back) initiation of tasks.

With reference to FIG. 4, one or more discovery processes are implemented to discover a namespace of the source filer and the policy collections of the source namespace (410). As described with an example of FIG. 2, the planner 110 can implement one or more walker processes 210 that can be utilized in the discovery process. The discovery process can identify the source namespace and the policy collections that are implemented on the source namespace.

The planner can provide a user interface for the operator to specify input that configures the migration plan 112 (420). In one implementation, information from the source namespace is used to prompt the operator for intelligent input that configures the migration plan 112. For example, as shown with examples of FIG. 8A through FIG. 8D, a user interface is generated to enable the user to provide input for creating and configuring the migration plan 112. The user interface can be generated from the source namespace, which can be discovered through one or more walker processes 210. The user interface can display container objects (e.g., volumes, q-trees and directories) from the information of the source namespace.

One embodiment enables the user to select through the user interface a specific container from the source namespace (422). The selection can correspond to a juncture within the namespace, and serves to make the migration of the source filer selective. With the selection, the migration may be limited to file system objects that are embedded within the selected container. In a variation, the user can provide input through the interface to enable the operator to provide exclusion input, which identifies file system objects that the operator does not want to migrate.

In another implementation, the operator can provide input that specifies container input, and specifically input to change an existing container type to a different container type (424). For example, in cDOT, there is limited ability to specify independent policies for embedded q-trees. Should the user wish to specify a policy for the q-tree container, he can use the user interface to provide input that promotes the q-tree to a volume. As a volume, the cDOT architecture permits specification of, for example, select policies.

Still further, the operator can specify input that changes the path of a given object container or other file system object when migration is performed (426). In one implementation, the user interface can generate an organization that reflects the organization and structure of the source namespace. Absent input from the user, the structure and organization of the source namespace is replicated for the destination namespace, meaning the object containers identified in the destination namespace include file path segments (context file paths) which are the same as corresponding containers of the source namespace. With input, the file paths of containers or other objects in the destination namespace 261 can be modified as compared to file paths that would otherwise be used with the default settings (e.g., to create one-to-one mapping with the source namespace). For example, in the preceding example where the container type is modified, the operator can elect to un-embed a volume that has been converted from a q-tree. The corresponding portion of the destination namespace 261 (i.e., context file path) can be modified based on the input.

Additionally, the user interface enables the operator to specify policy changes and additions for portions of the destination namespace (428). As shown with examples of FIG. 8A through 8D, policies can be displayed in interfaces that reflect existing source policy collections, and the interface can include rules for enabling the user to specify or configure policies differently for the destination namespace. For example, in the source filer running 7-MODE, an embedded q-tree can be associated with the security policy of the volume in its junction. For the destination running cDOT, the operator can provide input to promote the q-tree and further a new security policy that is specific for the promoted volume.

With operator input, the migration plan is determined (430). At least a portion of the migration plan 112 can be based on default parameters (432). In one implementation, for example, the default parameters can select to migrate file system objects with the same structure, organization, and granularity. Additionally, the policies can be replicated from the source filer 20 to the destination filer 50 with the default parameters set to achieve the same granularity (e.g., 1:1 mapping), in terms of logical equivalence, as that provided with the source filer 20.

The operator input can be received to alter the default parameters, thereby enabling the migration plan 112 to be configured per preferences and need of the operator (434). The alteration to the migration plan 112 can select junctures or containers for migration, specify alternative container types and paths for migrated containers. Additionally, the alteration to the migration plan 112 can select or modify policies from the default setting. In particular, the operator can specify container-specific policies with ability to change container types and position in order to achieve desired policies for select containers of the file system.

The migration plan 112 can be used to provision the destination filer 50 and configure the data migration system 100 (440). In one implementation, a destination namespace 261 is generated and used for provisioning the destination filer 50 (442). The destination namespace can define the structure and organization of the destination filer 50. Additionally, as described in greater detail with an example of FIG. 6, policy collections can be implemented on the policy server and resources of the destination filer 50 based on default settings and/or operator-specified parameters Additionally, the data migration system 100 can be configured to execute sessions where junctures or other portions of the source filer 20 are replicated on the destination filer 50 to populate the corresponding containers (which may have been modified by file path or type) (450). Additionally the data migration system 100 can be configured by the migration plan to sequence and queue the sessions automatically so that the destination filer is populated by junctures over time.

With reference to FIG. 5, the source namespace is discovered (510). For example, one or more walker processes 210 can discover the containers and junctures of the source filer 20, from which the remainder of the source namespace is determined.

The migration plan 112 can be created in part by mapping the containers of the source namespace to a destination namespace (520) that is under development. The planner 110 can create the migration plan with default settings that create the destination namespace using the same or equivalent container structure, organization and granularity as present with the source namespace. For example, the planner 110 can implement the migration with default settings that by default, substantially replicates the source namespace as the default namespace.

However, examples recognize that operators typically desire to upgrade or change the technological resources of the filer, in which case the source namespace is likely not optimal for the destination filer. In one implementation, the planner 110 can generate the migration plan 112 to include default settings that optimize the destination namespace (530). For example, containers on the source namespace can be combined or consolidated (e.g., multiple q-trees can be consolidated into one volume) (532). Additionally, the planner 110 can include operator settings to enable greater adjustments to the migration plan 112, such as changes to container types and file paths (534).

With reference to FIG. 6, the collection of policies on the source filer 20 can be identified in the context of the source namespace (610). As described with an example of FIG. 2, one or more walker processes 210 can be implemented to determine various kinds of policies for the source namespace, including export policy, efficiency policy, snapshot policy and quota policy, as well as other policies (e.g., security).

The policy component 240 of the planner 110 can map the collection of policies to the destination namespace using default rules and/or operator-specified parameters (620). For example, under default, the collection of policies for the source namespace can be formatted and converted into logically equivalent policy entries, which are subsequently implemented on the destination namespace. The default parameters can be set to achieve the same granularity (e.g., 1:1 mapping), in terms of logical equivalence, as that provided with the source filer 20. The operator input can permit configurations, selections and other changes to the policy collection, as provided by other examples described herein.

Once mapped, the policy component 240 can implement one or more optimization processes in order to configure the manner in which policies are stated and implemented, given, for example, the architecture of the destination filer 50

(630). As shown by examples provided below, the optimization can include de-duplicating policy entries present for the source filer 20 in order to create an equivalent set of policy statements (632). The de-duplication can be based on the architecture of the destination filer, which can differ by format, structure and syntax as to how policy entries are applied to defined file system objects. Likewise, some types of policy entries from the source namespace can be grouped as a result of the destination architecture permitting (or requiring) logically different structures to the policy entries (634). Still further, the policy entries of the source filer can be individually or by group restated using policy entries of the destination architect which are logically equivalent (636).

The following examples illustrate examples of how policy entries for a destination collection can be reformatted or structured by the planner 110 in order to optimize a corresponding subset of policy collections.

The following example illustrates two export policy entries for q-trees in 7-MODE, in which the same policy is applied to two different q-trees.
/vol/vol01/p17d4-sec=sys,rw=.mobstor.sp2.yahoo.com:.ymdb.sp2.yahoo.com,anon=0
/vol/vol01/p17d5       -sec=sys,rw=.mobstor.sp2.yahoo.com:.ymdb.sp2.yahoo.com,anon=0

A policy definition in cDOT consists of defining the policy (first line in following paragraph) and then adding in the access rules (last 2 lines). Accordingly, when converting to cDOT, the policy component 240 of the planner 110 can recognize the application of identical policies to different containers, and further carry application of the policy to corresponding volumes (if the q-trees are promoted). This results in the creation of one policy on the destination that applies to both volumes.
export-policy create -policyname secpol-1 -vserver ausys
export-policy rule create -policyname secpol-1 -clientmatch.mobstor.sp2.yahoo.com -rorule sys -rwrule sys -anon pcuser -vserver ausys
export-policy rule create -policyname secpol-1 -clientmatch.ymdb.sp2.yahoo.com -rorule sys -rwrule sys -anon pcuser -vserver ausys An example of another type of policy collection is snapshot policies. For the source filer 20 implemented under 7-MODE, policy entries for snapshot scheduling are defined per volume. Conversely, in cDOT, a single policy entry for snapshot scheduling can be applied to all volumes that are to implement the policy, and the policy entry can carry additional information for implementing the policy to the volumes. The following example illustrates how planner 110 can generate the destination policy collection for such policies with logical equivalences that are more optimal for the destination architecture:

| 7-MODE | snap sched vol0 |
|---|---|
| cDOT | Volume vol0: 0 2 6 volume snapshot policy create -vserver ausvs -policy sspol -enabled true -schedule1 hourly -count1 6 -schedule2 daily -count2 2 -schedule3 weekly -count3 0 |

Other snapshot policies as between 7-MODE and cDOT can differ by syntax, rather than application. For example, a snapshot reserve policy can differ by syntax but not logic.

| 7-MODE | snap reserve vm_images |
|---|---|
| cDOT | Volume vm_images: current snapshot |

-continued

| reserve is 20% or 41943040 k-bytes. volume modify -vserver ausvs -volume vol01 -percent-snapshot-space 20 |
|---|

Storage efficiency policies are generally governed by a policy that is applied to a volume. In 7-MODE, for example, a storage efficiency policy can include a deduplication process that is applied to a volume on a scheduled basis. In order to replicate such a policy in cDOT, the policy component 240 can specify a job that performs the efficiency task on a schedule, and then assign the job to a particular volume.

Quota policy as between 7-MODE and cDOT provides an example in which the mapping onto the destination filer 50 require policy generation and considerations which are not present for the source filer 20. In 7-MODE, for example, a new default user quota is derived on a per volume transaction. Conversely, in cDOT, the quota policy is a collection of quota rules for all volumes of a virtual server. For example, the SVM can have 5 policies, of which 1 is active, and the activation of the quota policy is on a volume-by-volume basis. Accordingly, the policy component 240 can generate the policy collection for quotas on the destination filer 50 by (i) generating additional policies, (ii) specifying values for the generated policies, and (iii) selectively activating a policy. The steps of generating quota policy for the destination filer in this manner can be performed programmatically and/or with user input (such as activation parameter or quota value).

With reference to FIG. 7, a migration plan 112 is determined (710), and the migration plan is used to determine the destination namespace (720). Additionally, the resources of the destination filer 50 can be determined through, for example, operator input (730). The identified resources can include the tier or level of hardware components for implementing the storage environment, as well as the arrangement of logical interfaces (LIFs) for physical ports that interconnect the hardware resources.

The destination namespace can be a basis for allocating the identified resources for implementing the destination filer (740). The resource selection can be based on operator input (742), and/or based on optimization parameters (744). In one implementation, the operator provides input that identifies the aggregates that are to have, for example, the best or lowest performance, based on expected traffic or usage (746). Alternatively, the determination can be made programmatically by resource planner 250, which can access, for example, health logs or usage data in the source information 215. In similar fashion, those volumes or junctures that have highest use can be interconnected across resources with relatively shortened paths based on LIF alignment (748). For example, an active portion of a namespace can be located on hardware resources that are co-located or separated by a single LIF distance.

User Interface

FIG. 8A through 8D illustrate example interfaces that are generated for an operator to enter input for configuring or defining a migration plan, according to one or more embodiments. The interfaces provided with examples of FIG. 8A through FIG. 8D can be generated by, for example, the user interface 220 of the planner 110 (as shown in FIG. 2). The interfaces of FIG. 8A through FIG. 8D can be created using the source namespace, which can be discovered using walker processes 210.

Figure 8A:
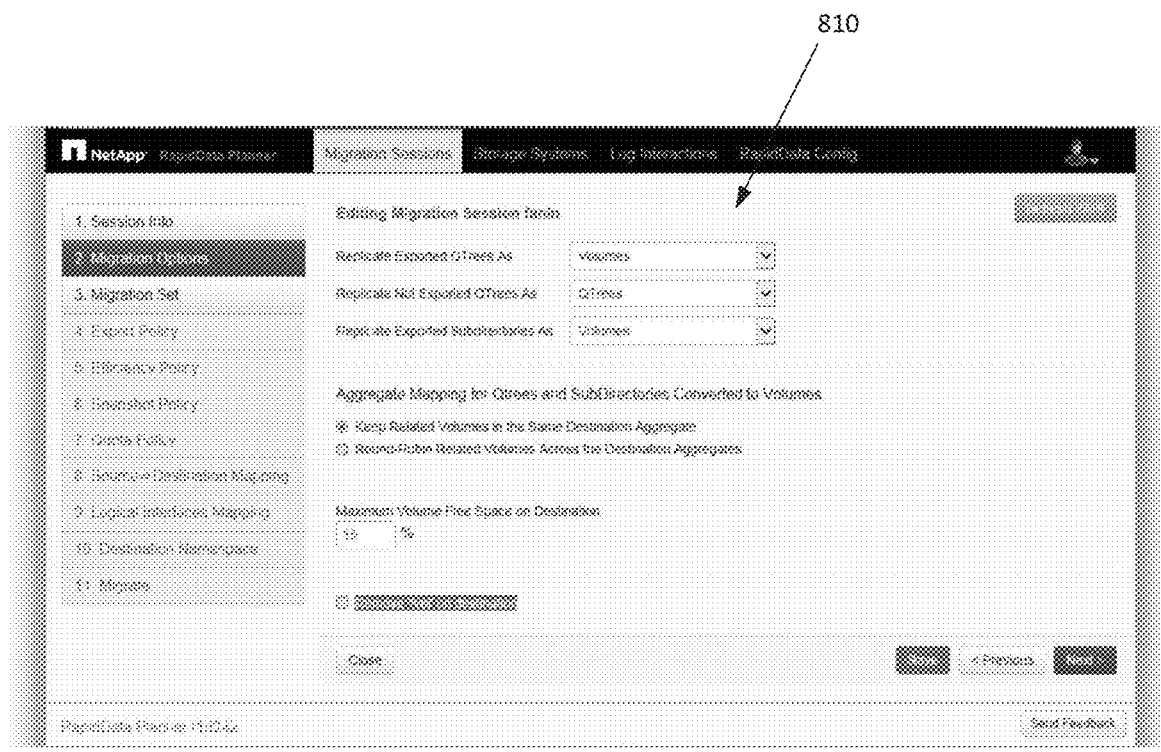
FIG. 8A through 8D illustrate example interfaces that are generated for an operator to enter input for configuring or defining a migration plan, according to one or more embodiments.

FIG. 8A illustrates an example interface 810 that enables the operator to specify global parameters for configuring the migration plan. The global parameters can, for example, enable the operator to globally specify conversions of containers by type, and also to specify which aggregate promoted volumes should occupy (e.g., same). The example assumes that, for example, a q-tree that is being promoted to a volume may need a different aggregate as it is likely to become more significant. A pull down menu can be generated which identifies the conversions possible as between the source and destination architecture.

Figure 8B:
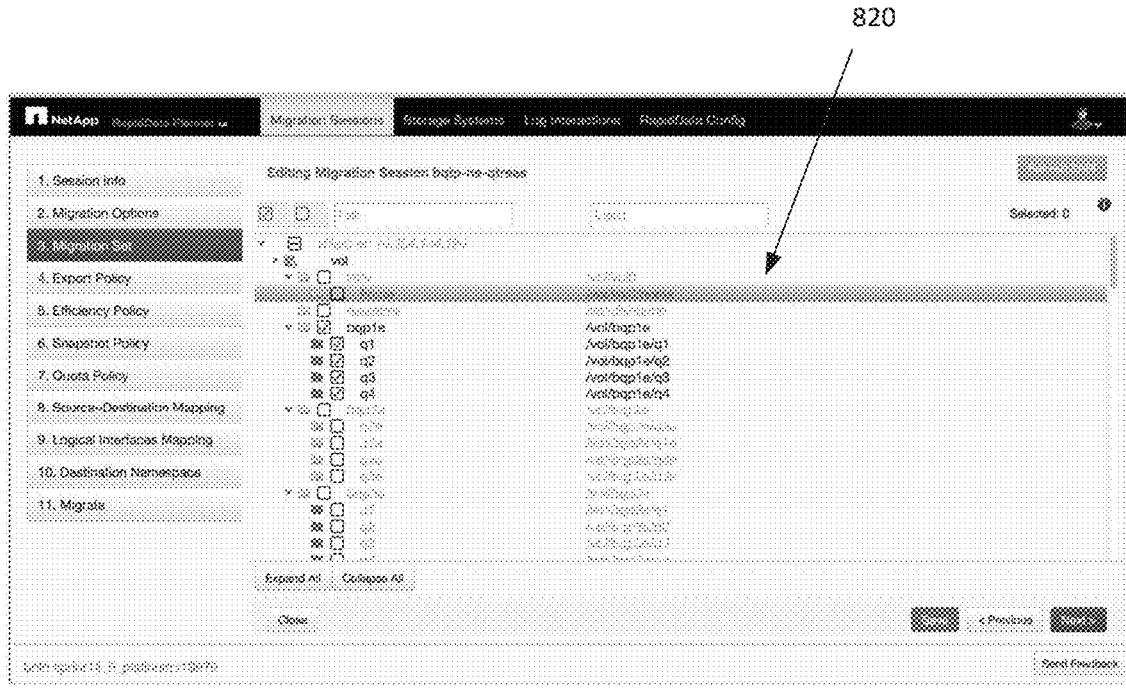

FIG. 8B illustrate an example interface 820 that enable an operator to select the volumes or portions of the source filer 20 that is to be migrated. The interface 820 can be generated in part based on the source namespace, so as to identify actual containers of the source namespace, including the organization of the containers on the source filer 20. Thus, the interfaces of FIG. 8B enables the operator to specify selective migration, based on knowledge of the source namespace. According to some variations, the planner 110 can also incorporate migration of multiple source filers into one destination filer, and an example interface of FIG. 8B enables the operator to specify portions of multiple sources to aggregate.

Figure 8C:
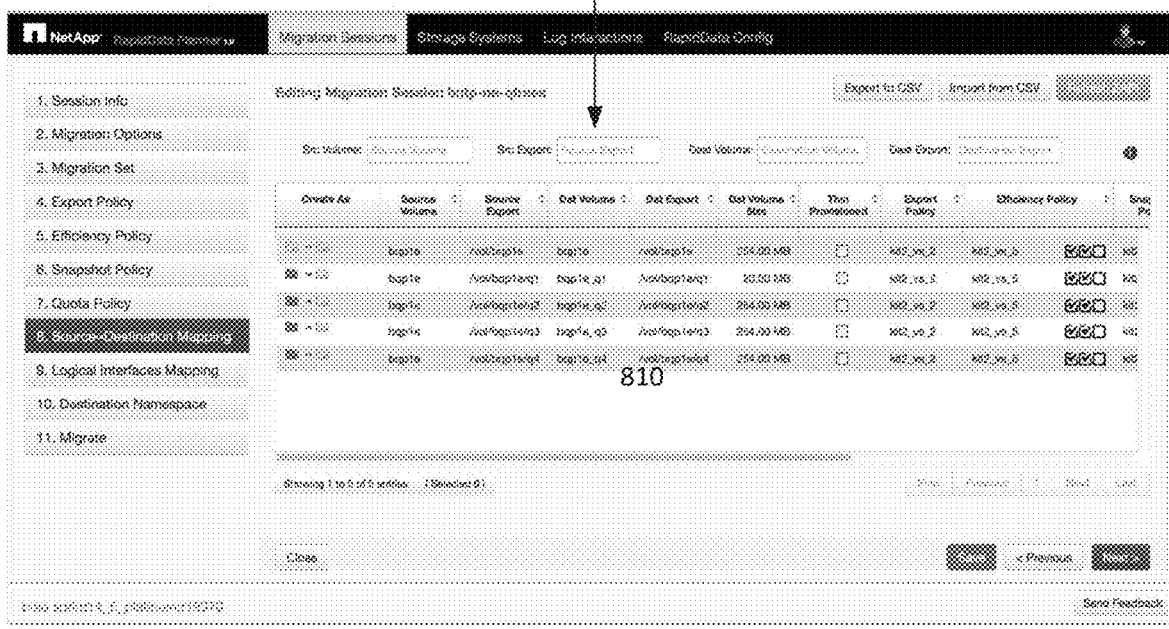
Figure 8D:
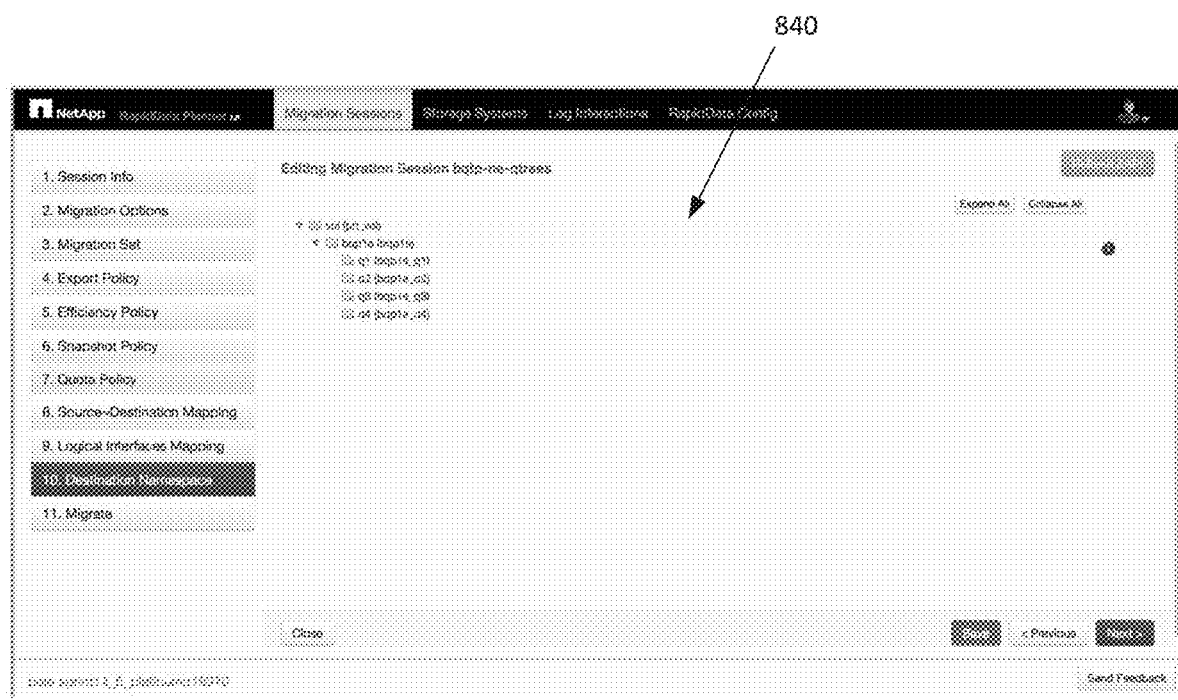

FIG. 8C illustrates an interface 830 that illustrates how objects of the source namespace map to objects of the destination namespace, based on global policies (which can be selected or set by default). FIG. 8D illustrates an interface for enabling the user to view a destination namespace. Based on the interfaces 830, 840, the user can select policies and/or provide input parameters.

EXAMPLES

Figure 9A:
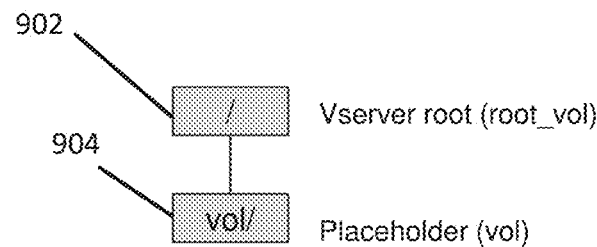
FIG. 9A through FIG. 9E illustrate the provisioning of a destination filer in which changes are made to container types.
Figure 9B:
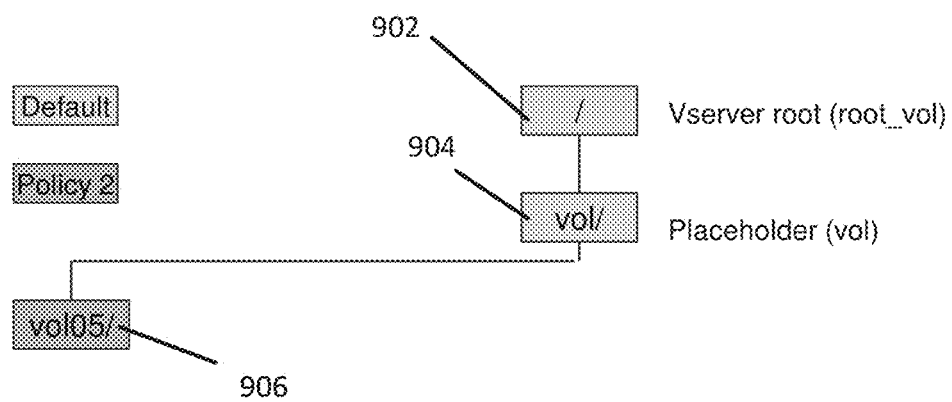

FIG. 9A through FIG. 9E is a representative flow for the provisioning of a destination filer in which changes are made to container types. In a specific example provided, a 7-MODE source namespace is identified which includes four volumes under a root volume 902, and each volume includes two embedded q-trees (not shown). The example assumes that the destination namespace is for cDOT implementation that promotes the q-trees to volumes. In FIG. 9A, the provisioning of the destination filer 50 includes generating a placeholder volume 904 under the root volume 902, which in FIG. 9A can be implemented using the destination namespace entry:

volume create -volume vol -aggregate n02_sata01- vserver ausys -junction-path/vol In FIG. 9B, the volumes 906, which in the source namespace were previously mounted under the root node 902, are mounted under the placeholder volume using the following namespace entries:

volume create vol05 -aggregate n02_sata01-size 100 GB -vserver ausys -autosize true -junction-path/vol/vol05- policy vol-pol2
    volume create vol06 -aggregate n02_sata01 -size 100 GB -vserver ausys -autosize true -junction-path/vol/vol06 -policy vol-pol2
    volume create vol07 -aggregate n02_sata01 -size 100 GB -vserver ausys -autosize true -junction-path/vol/vol07 -policy vol-pol2
    volume create vol08 -aggregate n02_sata01 -size 100 GB -vserver ausys -autosize true -junction-path/vol/vol08 -policy vol-pol2

Figure 9C:
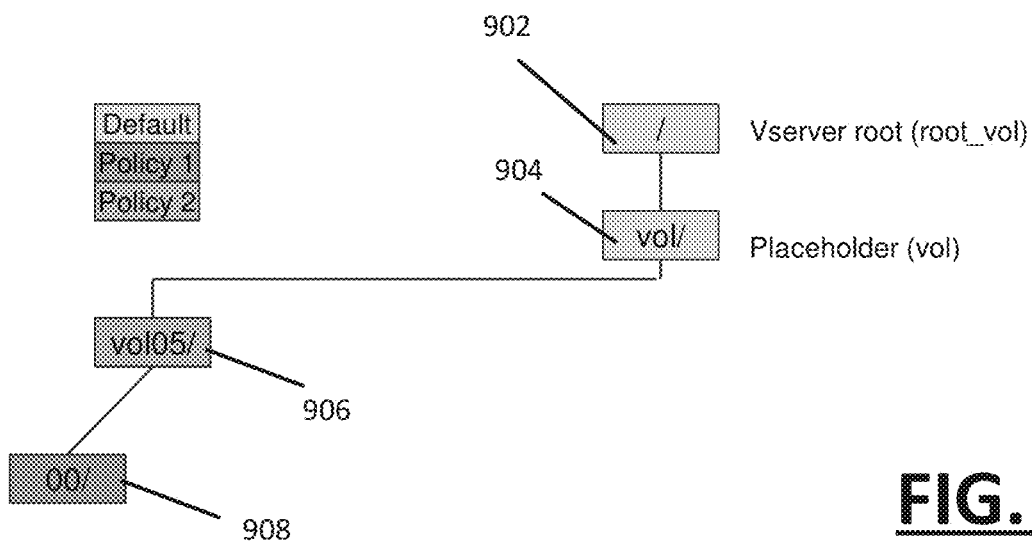
Figure 9D:
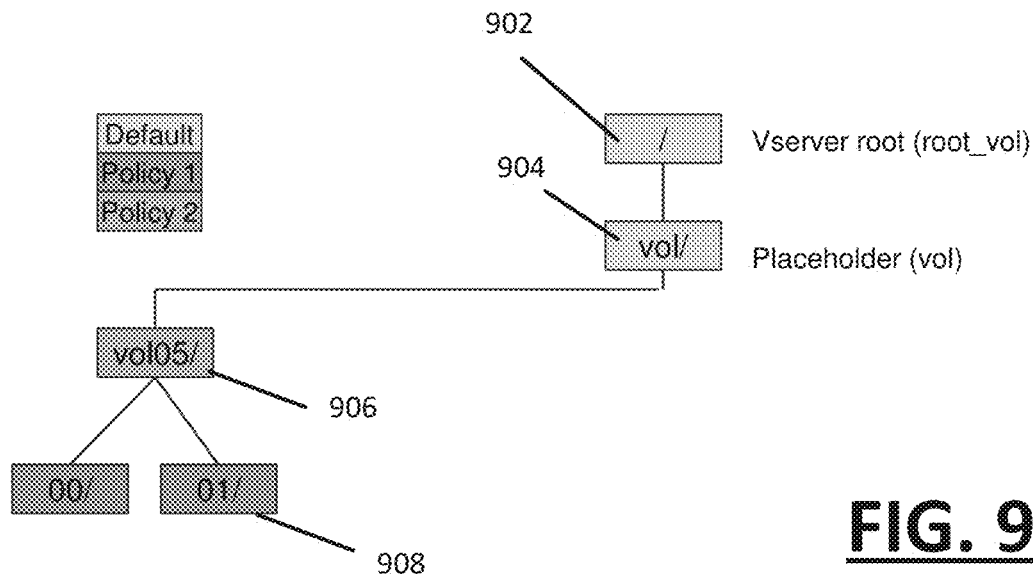
Figure 9E:
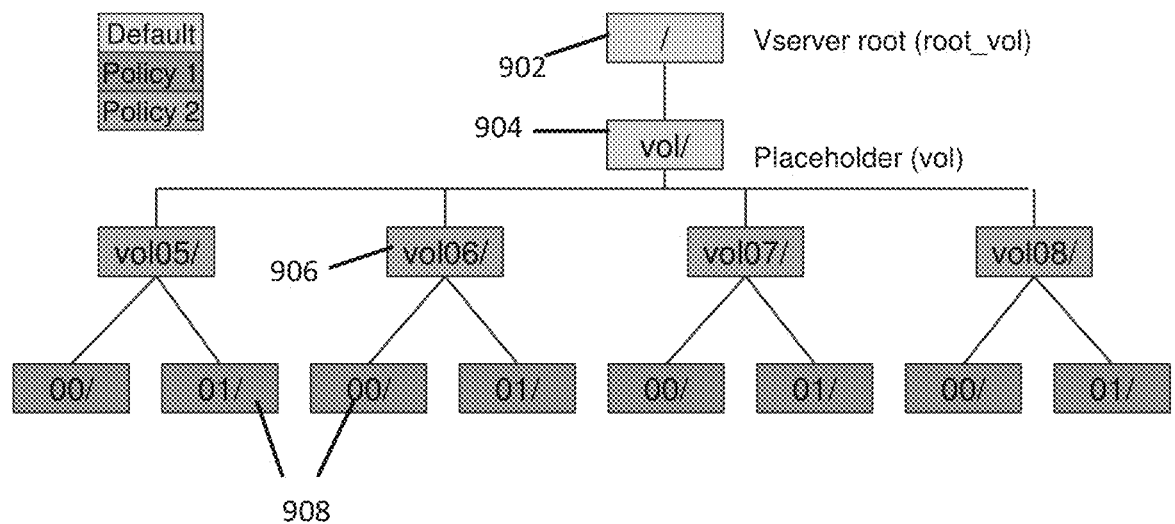

In FIG. 9C and FIG. 9D, the remaining q-trees present in the source namespace are now mounted within the placeholder volume structure as follows (note that only the first two q-trees are shown for brevity):

volume create vol05-00 -aggregate n02_sata01 -size 100 GB -vserver ausys -autosize true -junction-path/vol/vol05/00 -policy vol-pot
    volume create vol05-01 -aggregate n02_sata01 -size 100 GB -vserver ausys -autosize true -junction-path/vol/vol05/01 -policy vol-pol FIG. 9E shows the result. Where in the source namespace, 4 volumes includes 8 embedded q-trees, now in the destination namespace q-trees are modified to volumes 908, with the addition of the placeholder volume. Thus, the example provided converts the source namespace with 12 containers (4 volumes and 8 q-trees) into a destination namespace with 13 containers (all volumes).

Computer System

Figure 10:
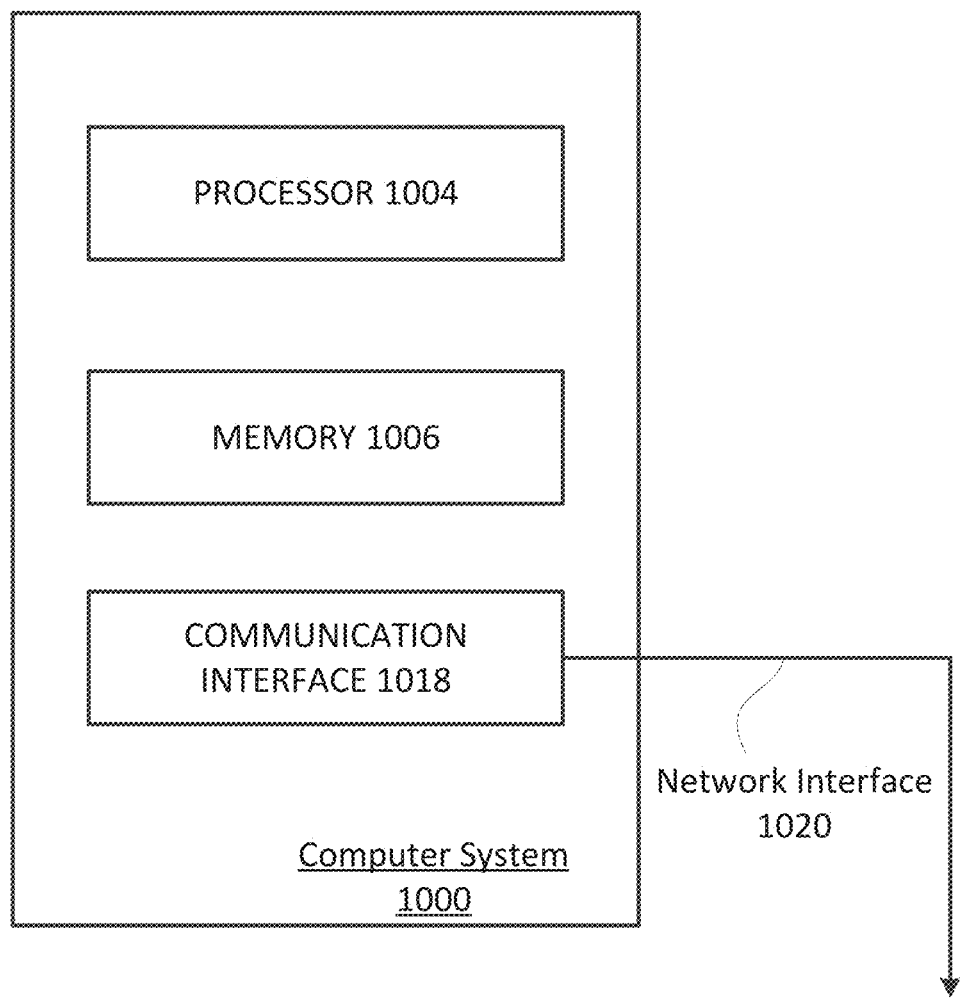
FIG. 10 is a block diagram that illustrates a computer system upon which embodiments described herein may be implemented.

FIG. 10 is a block diagram that illustrates a computer system upon which embodiments described herein may be implemented. For example, in the context of FIG. 1 or FIG. 2, planner 110 may be implemented using one or more computer systems such as described by FIG. 10. Still further, methods such as described with FIG. 3 through FIG. 7 can be implemented using a computer such as described with an example of FIG. 10.

In an embodiment, computer system 1000 includes processor 1004, memory 1006 (including non-transitory memory), and a communication interface 1018. Computer system 1000 includes at least one processor 1004 for processing information. Computer system 1000 also includes a memory 1006, such as a random access memory (RAM) or other dynamic storage device, for storing information and instructions to be executed by processor 1004. The memory 1006 also may be used for storing temporary variables or other intermediate information during execution of instructions to be executed by processor 1004. Computer system 1000 may also include a read only memory (ROM) or other static storage device for storing static information and instructions for processor 1004. A storage device 1010, such as a magnetic disk or optical disk, is provided for storing information and instructions. The communication interface 1018 may enable the computer system 1000 to communicate with one or more networks through use of the network link 1020 (wireless or wireline).

In one implementation, memory 1006 may store instructions for implementing functionality such as described with an example of FIG. 1 or FIG. 2, or implemented through an example method such as described with FIG. 3 through FIG. 7. Likewise, the processor 1004 may execute the instructions in providing functionality as described with FIG. 1 or FIG. 2, or performing operations as described with an example method of FIG. 3 through FIG. 7.

Embodiments described herein are related to the use of computer system 1000 for implementing the techniques described herein. According to one embodiment, those techniques are performed by computer system 1000 in response to processor 1004 executing one or more sequences of one or more instructions contained in the memory 1006. Such instructions may be read into memory 1006 from another machine-readable medium, such as storage device 1010. Execution of the sequences of instructions contained in memory 1006 causes processor 1004 to perform the process steps described herein. In alternative embodiments, hard-wired circuitry may be used in place of or in combination with software instructions to implement embodiments described herein. Thus, embodiments described are not limited to any specific combination of hardware circuitry and software.

Although illustrative embodiments have been described in detail herein with reference to the accompanying drawings, variations to specific embodiments and details are encompassed by this disclosure. It is intended that the scope of embodiments described herein be defined by claims and their equivalents. Furthermore, it is contemplated that a particular feature described, either individually or as part of an embodiment, can be combined with other individually described features, or parts of other embodiments. Thus, absence of describing combinations should not preclude the inventor(s) from claiming rights to such combinations.

What is claimed is:

1. A method comprising:
   identifying a source namespace associated with a source file system of a source system;
   receiving a first specification of a container associated with the source namespace of the source system;
   determining a container type for implementing the container within a destination namespace for a destination system;
   generating a migration plan to migrate the source file system from the source system to the destination system as a destination file system having the destination namespace with the container having the container type; and
   in response to receiving a second specification of a file path to utilize for the container once migrated to the destination system, including the file path within the migration plan.

2. The method of claim 1, comprising:
   limiting the migration plan to file system objects embedded within the container.

3. The method of claim 1, wherein the container type corresponds to a current container type of the container associated with the source namespace.

4. The method of claim 1, wherein the container type is different than a current container type of the container associated with the source namespace.

5. The method of claim 1, comprising:
   including a policy within the migration plan.

6. The method of claim 1, wherein the file path corresponds to a current file path of the container associated with the source namespace.

7. The method of claim 1, wherein the file path is different than a current file path of the container associated with the source namespace.

8. The method of claim 1, comprising:
   in response to receiving a third specification of a policy to utilize for the container once migrated to the destination system, including the policy within the migration plan.

9. The method of claim 8, wherein the policy corresponds to a current policy of the container associated with the source namespace.

10. The method of claim 8, wherein the policy is different than a current policy of the container associated with the source namespace.

11. The method of claim 1, comprising:
    including a default parameter within the migration plan, wherein the default parameter corresponds to a selection of file system objects to migrate based upon the file system objects having a same structure.

12. The method of claim 1, comprising:
    including a default parameter within the migration plan, wherein the default parameter corresponds to a selection of file system objects to migrate based upon the file system objects having a same organization.

13. The method of claim 1, comprising:
    including a default parameter within the migration plan, wherein the default parameter corresponds to a selection of file system objects to migrate based upon the file system objects having a same granularity.

14. The method of claim 1, comprising:
    utilizing the migration plan to determine the destination namespace.

15. A non-transitory machine readable medium comprising instructions for performing a method, which when executed by a machine, causes the machine to:
    determine a source namespace associated with a source file system of a source system;
    receive a specification of a container associated with the source namespace of the source system;
    determine a container type for implementing the container within a destination namespace for a destination system;
    generate a migration plan to migrate the source file system from the source system to the destination system as a destination file system having the destination namespace with the container having the container type; and
    include a default parameter within the migration plan, wherein the default parameter corresponds to a selection of file system objects to migrate based upon the file system objects having a same structure.

16. The non-transitory machine readable medium of claim 15, wherein the instructions cause the machine to:
    implement the migration plan to perform resource allocation for the destination namespace.

17. The non-transitory machine readable medium of claim 15, wherein the instructions cause the machine to:
    implement the migration plan to select an aggregate for the destination namespace.

18. The non-transitory machine readable medium of claim 15, wherein the instructions cause the machine to:
    implement the migration plan to determine a logical interface arrangement for ports associated with the destination system.

19. A computing device comprising:
    a memory comprising machine executable code for performing a method; and
    a processor coupled to the memory, the processor configured to execute the machine executable code to cause the processor to:
    determine a source namespace associated with a source file system of a source system;
    receive a specification of a container associated with the source namespace of the source system;
    determine a container type for implementing the container within a destination namespace for a destination system;
    generate a migration plan to migrate the source file system from the source system to the destination system as a destination file system having the destination namespace with the container having the container type; and
    include a default parameter within the migration plan, wherein the default parameter corresponds to a selection of file system objects to migrate based upon the file system objects having a same organization.

20. The computing device of claim 19, wherein the machine executable code causes the processor to:
  implement the migration plan to identify resources for implementing the destination namespace at the destination system based upon optimization parameters.

* * * * *